United States Patent
Kumar et al.

(10) Patent No.: US 12,288,064 B2
(45) Date of Patent: Apr. 29, 2025

(54) HARDWARE-BASED MESSAGE BLOCK PADDING FOR HASH ALGORITHMS

(71) Applicant: International Business Machines Corporation, Armonk, NY (US)

(72) Inventors: Manoj Kumar, Yorktown Heights, NY (US); Silvia Melitta Mueller, St. Ingbert (DE); Debapriya Chatterjee, Austin, TX (US); Niels Fricke, Herrenberg (DE); Martijn Diede Berkers, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 17/884,739

(22) Filed: Aug. 10, 2022

(65) Prior Publication Data
US 2024/0053989 A1 Feb. 15, 2024

(51) Int. Cl.
*G06F 9/30* (2018.01)
*G06F 9/38* (2018.01)
(Continued)

(52) U.S. Cl.
CPC ........ *G06F 9/30101* (2013.01); *G06F 9/3802* (2013.01); *H04L 9/0643* (2013.01);
(Continued)

(58) Field of Classification Search
CPC .......... G06F 21/79; G06F 21/78; G06F 21/70; G06F 21/00; G06F 9/30007;
(Continued)

(56) References Cited

U.S. PATENT DOCUMENTS 7,295,671 B2  11/2007  Snell
7,702,100 B2   4/2010  Han
(Continued)

FOREIGN PATENT DOCUMENTS

CN    1658550 A     8/2005
CN  112152785 A    12/2020
(Continued)

OTHER PUBLICATIONS

Pittalia, P. P. (2019), A comparative study of hash algorithms in cryptography, International Journal of Computer Science and Mobile Computing, 8(6), 147-152 (Year: 2019).*
(Continued)

*Primary Examiner* — Alexander Lagor
*Assistant Examiner* — Brandon Binczak
(74) *Attorney, Agent, or Firm* — CANTOR COLBURN LLP; Edward Wixted

(57) ABSTRACT

A processor includes an execution unit for executing a message padding instruction including an operand field indicating a register buffering a message block segment of a message block to be padded and a mode field indicating which hash functions is to be applied to the message block. The execution unit includes a padding circuit configured to receive a message block segment from a register indicated by the operand field, where the message block spans multiple registers in a register file. Based on which hash function is indicated by the mode field, the padding circuit selects a byte location in the message block segment at which to insert at least one padding byte and inserts the at least one padding byte at the byte location within the message block segment. The message block segment as padded by the at least one padding byte is written back to the register file.

20 Claims, 25 Drawing Sheets

(51) Int. Cl.
 *G09C 1/00* (2006.01)
 *H04L 9/06* (2006.01)
(52) U.S. Cl.
 CPC ............ *G09C 1/00* (2013.01); *H04L 2209/12* (2013.01); *H04L 2209/20* (2013.01)
(58) Field of Classification Search
 CPC .... G06F 9/30003; G06F 9/30; G06F 9/30101; G06F 9/30098; G06F 9/3804; G06F 9/3802; G06F 9/38; G06F 9/3814; G06F 9/345; G06F 21/602; G06F 9/30145; G06F 9/3016; G06F 9/30029; G06F 9/30058; H04L 9/0643; H04L 2209/12; H04L 2209/20; H04L 9/3236; G09C 1/00
 See application file for complete search history.

(56) References Cited

U.S. PATENT DOCUMENTS

| | | | |
|---|---|---|---|
| 7,783,037 | B1 | 8/2010 | Bong |
| 8,042,025 | B2 | 10/2011 | Gopal |
| 8,194,854 | B2 | 6/2012 | Gueron |
| 8,340,280 | B2 | 12/2012 | Gueron |
| 8,913,740 | B2 | 12/2014 | Gueron |
| 10,129,018 | B2 | 11/2018 | Satpathy |
| 10,142,098 | B2 | 11/2018 | Suresh |
| 10,256,971 | B2 | 4/2019 | Gueron |
| 10,305,680 | B2 | 5/2019 | Gomes |
| 10,313,108 | B2 | 6/2019 | Suresh |
| 10,346,343 | B2 | 7/2019 | Suresh |
| 10,348,506 | B2 | 7/2019 | Greiner |
| 10,432,393 | B2 | 10/2019 | Gueron |
| 10,581,593 | B2 | 3/2020 | Gomes |
| 10,877,753 | B2 | 12/2020 | Bradbury |
| 10,924,282 | B2 | 2/2021 | Brostrom |
| 11,121,856 | B2 | 9/2021 | Satpathy |
| 11,128,443 | B2 | 9/2021 | Gueron |
| 2002/0066014 | A1* | 5/2002 | Dworkin ............... H04L 9/0643 713/168 |
| 2003/0135530 | A1 | 7/2003 | Parthasarathy |
| 2004/0202317 | A1 | 10/2004 | Demjanenko |
| 2004/0252831 | A1 | 12/2004 | Uehara |
| 2004/0255130 | A1 | 12/2004 | Henry |
| 2005/0089160 | A1* | 4/2005 | Crispin ................... G06F 21/72 712/E9.032 |
| 2008/0240423 | A1 | 10/2008 | Gueron |
| 2009/0052659 | A1 | 2/2009 | Gueron |
| 2009/0141887 | A1 | 6/2009 | Yap |
| 2010/0049986 | A1* | 2/2010 | Watanabe ............. H04L 9/0643 713/181 |
| 2011/0231636 | A1 | 9/2011 | Olson |
| 2011/0246548 | A1 | 10/2011 | Yen |
| 2011/0255689 | A1 | 10/2011 | Bolotov |
| 2015/0043729 | A1 | 2/2015 | Gopal |
| 2015/0098563 | A1 | 4/2015 | Gulley |
| 2016/0119126 | A1 | 4/2016 | Shay |
| 2017/0134163 | A1 | 5/2017 | Suresh |
| 2017/0373836 | A1 | 12/2017 | Rarick |
| 2018/0122271 | A1 | 5/2018 | Ghosh |
| 2019/0205093 | A1 | 7/2019 | Suresh |
| 2019/0286443 | A1 | 9/2019 | Solomatnikov et al. |
| 2019/0319782 | A1 | 10/2019 | Ghosh |
| 2019/0386815 | A1 | 12/2019 | Satpathy |
| 2020/0134234 | A1 | 4/2020 | Lemay |
| 2021/0152330 | A1 | 5/2021 | Satpathy |
| 2021/0203504 | A1 | 7/2021 | Brandt |
| 2022/0206958 | A1 | 6/2022 | LeMay |
| 2023/0269076 | A1 | 8/2023 | Brandt |

FOREIGN PATENT DOCUMENTS

| | | | |
|---|---|---|---|
| CN | 113485751 | A | 10/2021 |
| EP | 1449063 | B1 | 8/2004 |
| TW | 200536331 | A | 11/2005 |
| TW | 201135477 | A | 10/2011 |
| TW | 201203108 | A | 1/2012 |
| TW | 201519623 | A | 5/2015 |
| TW | 201717573 | A | 5/2017 |

OTHER PUBLICATIONS

National Institute of Standards and Technology (NIST) (2015), SHA-3 Standard: Permutation-Based Hash and Extendable-Output Functions, FIPS PUB 202, 1-37 (Year: 2015).*
Bertoni, Guido et al., "KangarooTwelve: fast hashing based on Keccak-p." IACR Cryptology ePrint Archive (2018), 19 pages.
Dworkin, M., "SHA-3 Standard: Permutation-Based Hash and Extendable-Output Functions NIST FIPS 202," Aug. 2015, 37 pages, National Institute of Standards and Technology, Gaithersburg, MD.
Y. Akiya et al., "SHA-3-LPHP: Hardware Acceleration of SHA-3 for Low-Power High-Performance Systems," 2021 IEEE International Symposium on Software Reliability Engineering Workshops (ISSREW), Wuhan, China, 2021, pp. 393-398, doi: 10.1109/ISSREW53611.2021.00107.
Adams, A. et al., "Cryptography Acceleration in a RISC-V GPGPU," CARRV 2021, Jun. 17, 2021, 7 pages.
Advanced Encryption Standard (AES), Nov. 26, 2001, pp. 1-51, FIPS PUB 197, National Institute of Standards and Technology (NIST), US.
Anonymous, "Method of Early Detection and Halting of Ransomware Attacks," IPCOM000268682D, IP.com, Feb. 15, 2022, 5 pages.
Anonymous, "A Method to Reduce Stick Table Synchronization Storm Among Load Balancer Cluster," IPCOM000268809D, Mar. 1, 2022, 6 pages, IP.com.
Anonymous, "Method of Flash Acceleration in Replication for Consistent Hash Ring," Mar. 13, 2016, 9 pages, IPCOM000245503D, IP.com.
Dworkin, M., "Recommendation for Block Cipher Modes of Operation: Galois/Counter Mode (GCM) and GMAC," NIST Special Publication SP800-38D, Nov. 2007, 39 pages, National institute for Standards and Technology, Gaithersburg, MD.
Gueron, S. et al., "Intel Carry-Less multiplication instruction and its usage for computing GCM Mode," May 2010, 76 pages, Intel Corporation.
Gulley, S. et al., "Intel SHA Extensions: New Instructions Supporting the Secure Hash Algorithm on Intel Architecture Processors," Jul. 2013, 22 pages, Intel Corporation.
IEEE standard: 1619-2018, "IEEE Standard for Cryptographic Protection of Data on Block-Oriented Storage Devices," Oct. 23, 2018, 41 pages, IEEE, New York, NY.
Jang, K. et al., "SSL Shader: Cheap SSL Acceleration With Commodity Processors," 8th USENIX Symposium on Networked Systems Design and Implementation, Mar. 2011, 14 pages, USENIX Association, Boston, MA.
McGrew, D. et al., "The Galois/Counter Mode of Operation," Feb. 2004, 43 pages.
NIST FIPS 180-4 "Secure Hash Standard," Aug. 2015, 37 pages, National Institute of Standards and Technology, Gaithersburg, MD.
NIST FIPS 202 "SHA-3 Standard: Permutation-Based Hash and Extendable-Output Functions," Aug. 2015, 37 pages, National Institute of Standards and Technology, Gaithersburg, MD.
Appendix P, List of IBM Patents or Patent Applications Treated as Related, 2 pages.
International Searching Authority of European Patent Office, International Search Report and Written Opinion, International Application No. PCT/EP2023/068147, Oct. 4, 2023, 14 pages.
International Searching Authority of European Patent Office, International Search Report and Written Opinion, International Application No. PCT/EP2023/071362, Oct. 18, 2023, 13 pages.
Y. Chen et al., "A programmable Galois Field processor for the Internet of Things," 2017 ACM/IEEE 44th Annual International Symposium on Computer Architecture (ISCA), Toronto, ON, Canada, 2017, pp. 55-68, doi: 10.1145/3079856.3080227.

(56) References Cited

OTHER PUBLICATIONS

Anonymous, "Method and System for Prevention of Anti-Tampering of Media Content," IPCOM000259235D, Jul. 22, 2019, 4 pages, IP.com.
Anonymous, "Parallelizable Hashing Algorithm," IPCOM000254123D, Jun. 4, 2018, 2 pages, IP.com.
Bos, J.W. et al., Performance Analysis of the SHA-3 Candidates on Exotic Multi-Core Architectures, CHES 2010 12th International Workshop, Aug. 17-20, 2010, 15 pages, Santa Barbara, CA.
Ghosh, Moinak, "Optimizing Rolling Hash Computation Using Simd Vector Registers," IPCOM000226555D, Apr. 16, 2013, 4 pages, IP.com.
Keller, S. et al., "Secure Hash Algorithm 3 Validation System (SHA3VS)," Jan. 29, 2016, 33 pages, National Institute of Standards and Technology, USA.
Salehani, Y. et al., "NESHA-256, New 256-BIT Secure Hash Algorithm," Cryptology ePrint Archive, Paper 2009/033, 2009, 16 pages, https://eprint.iacr.org/2009/033.
TW IPO, Notice of Allowance for P202301322TW01, Sep. 26, 2024, 6 pages (English translation).
P202201607TW01 Office Action, Jul. 1, 2024, 4 pages, TW Patent Office (English Translation).
International Searching Authority, Notification of Transmittal of the International Search Report and the Written Opinion of the International Searching Authority, Nov. 11, 2023, 12 pages, International Application No. PCT/EP2023/071370.
International Searching Authority, Notification of Transmittal of the International Search Report and the Written Opinion of the International Searching Authority, Nov. 6, 2023, 12 pages, International Application No. PCT/EP2023/071369.

* cited by examiner

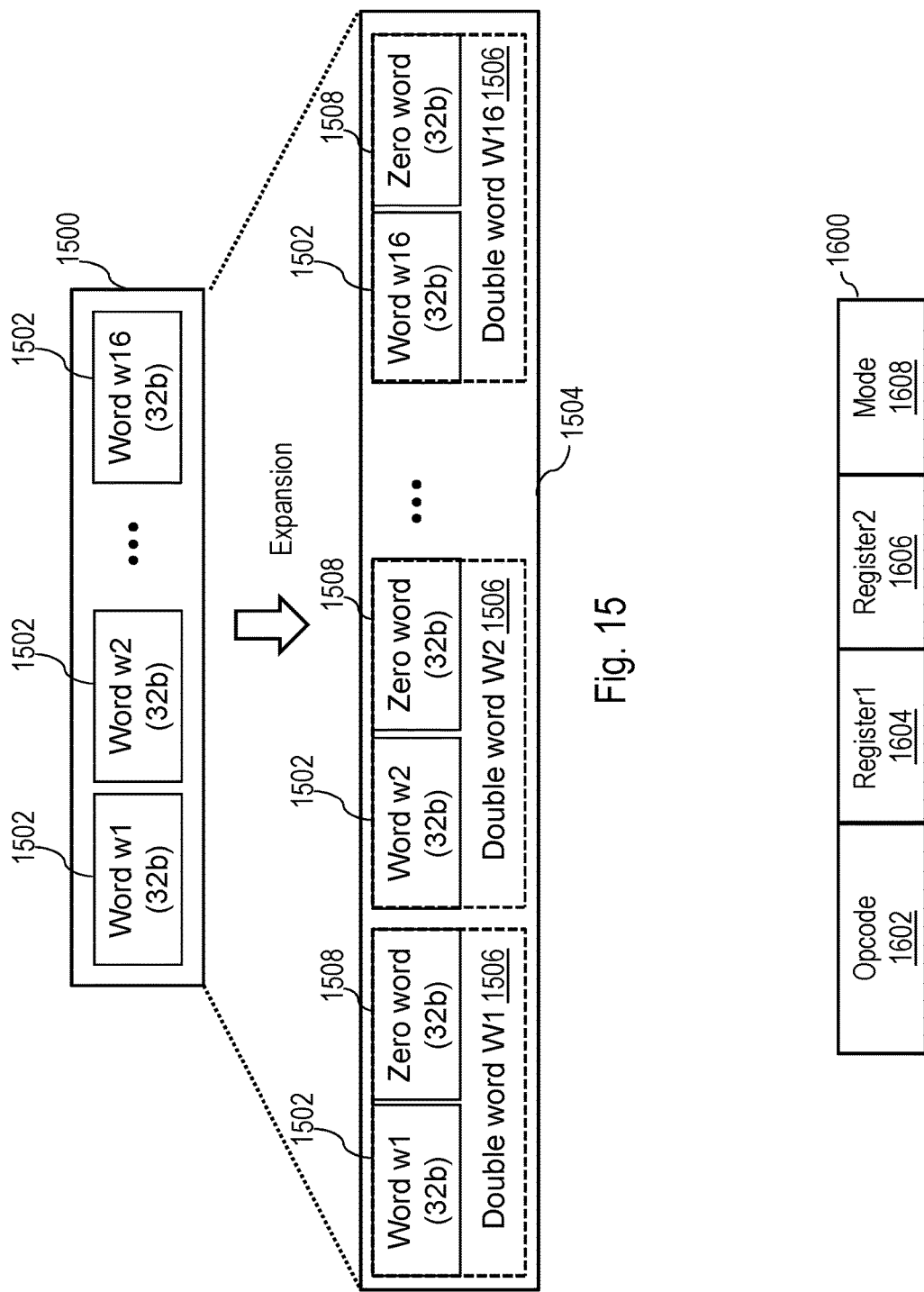

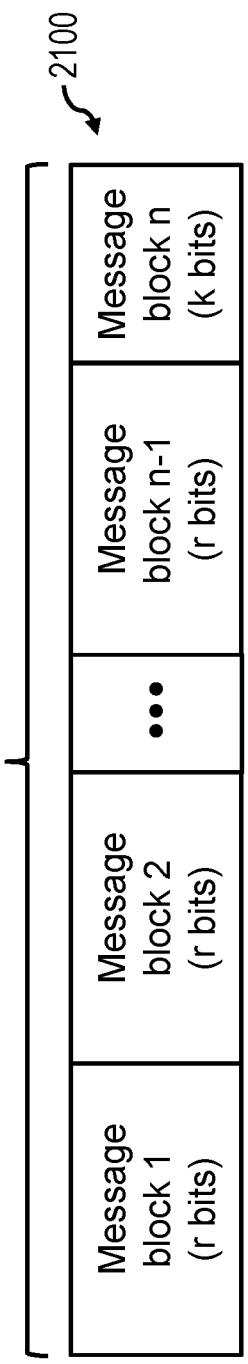
Fig. 21A
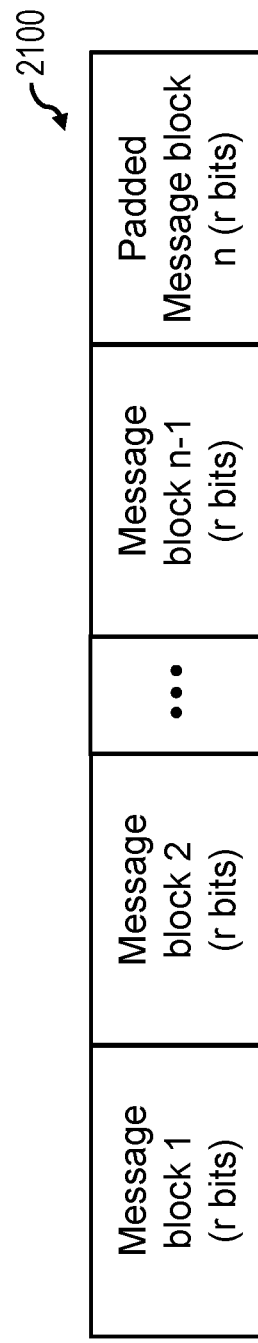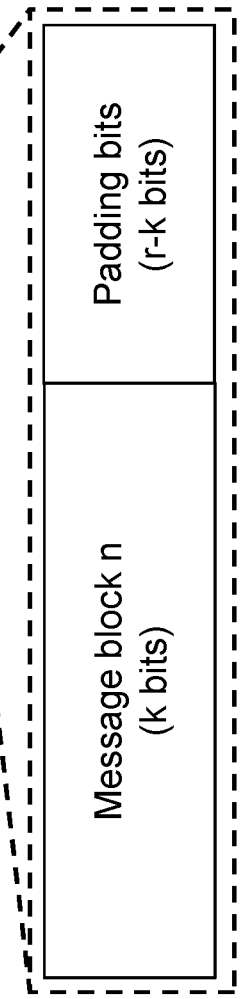
Fig. 21B

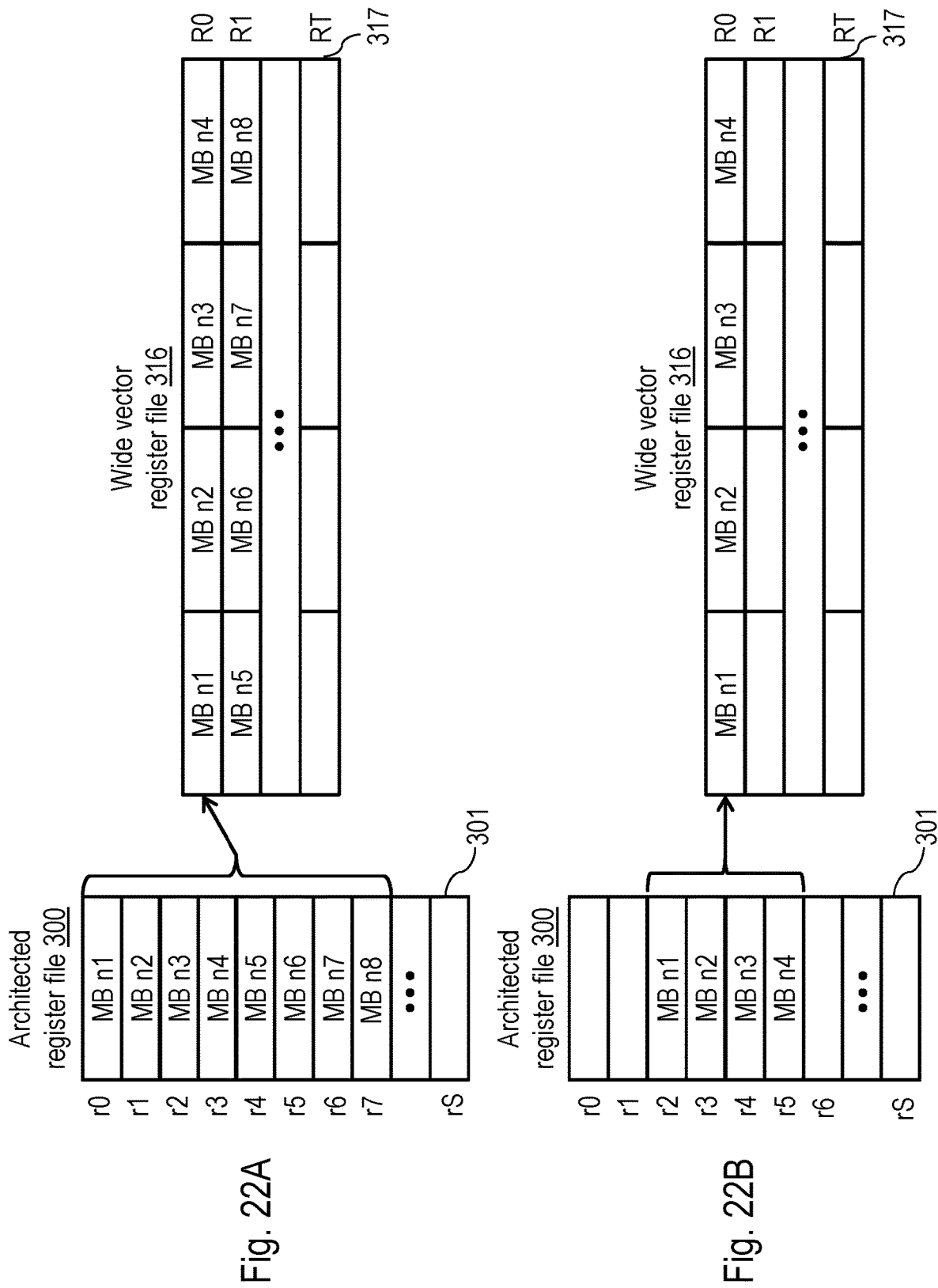

HARDWARE-BASED MESSAGE BLOCK PADDING FOR HASH ALGORITHMS

BACKGROUND OF THE INVENTION

The present invention relates in general to data processing and, in particular, to efficiently padding message blocks of hash algorithms.

An important aspect of data security is the protection of data at rest (e.g., while stored in a data storage device) or data in transit (e.g., during transmission) through encryption. Generally speaking, encryption involves the conversion of unencrypted data (referred to as plaintext) to encrypted data (referred to as ciphertext) through the combination of the plaintext and one or more encryption keys utilizing an encryption function. To recover the plaintext from the ciphertext, the ciphertext is processed by a decryption function utilizing one or more decryption keys. Thus, encryption provides data security by the requirement that an additional secret (i.e., the decryption key(s)) be known by a party prior to that party being able to access the protected plaintext.

In many implementations, data encryption is performed utilizing software executing on a general purpose processor. While the implementation of encryption in software provides the advantages of being able to select differing encryption algorithms and easily adapting a selected encryption algorithm to use various data lengths, performing encryption in software has the concomitant disadvantage of relatively poor performance. As the volumes of data sets continue to dramatically increase in the era of "big data," the performance achieved by software-implemented encryption can be unacceptable when encrypting large messages and/or data sets. The concern with encryption performance also arises due to the increased need to run enterprise applications utilizing encrypted data in order to mitigate the consequence of "hacking" and other cyber-attacks and to ensure regulatory compliance. Accordingly, it is often desirable to provide support for encryption in hardware to achieve improved performance.

BRIEF SUMMARY

The present disclosure appreciates that one class of encryption algorithm for which it would be desirable to provide hardware support is hash functions, including but not limited to the hash functions belonging to the Secure Hash Algorithm (SHA) family of standards. As is known in the art, the SHA family of standards define hash algorithms approved by the National Institute for Standards (NIST) for generating a condensed representation of a message (i.e., a message digest). The SHA family of standards is specified in two Federal Information Processing Standards (FIPS): FIPS 180-4 "Secure Hash Standard" and FIPS 202 "SHA-3 Standard: Permutation-Based Hash and Extendable-Output Functions," which are incorporated herein by reference. FIPS 180-4 specifies seven hash algorithms, namely, SHA-1 (Secure Hash Algorithm-1) and the SHA-2 family of hash algorithms, including SHA-224, SHA-256, SHA-384, SHA-512, SHA-512/224, and SHA-512/256. FIPS 202 additionally specifies four SHA-3 hash algorithms having a fixed-length output (i.e., SHA3-224, SHA3-256, SHA3-384, and SHA3-512) and two closely related "extendable-output" functions (XOFs) named SHAKE128 and SHAKE256 (where SHAKE is an abbreviation for Secure Hash Algorithm and Keccak). Additional uses for the SHA family of standards (e.g., as a stream cipher, an authenticated encryption system, or a tree hashing scheme) have not yet been adopted as NIST standards.

Given the wide diversity of hash functions and data sizes of hash functions (even within the SHA family of standards), broad support in hardware for hash functions can lead to large areas within a processor floorplan being consumed by circuitry implementing hash functions. As a result, some hardware solutions choose to implement such circuitry separately from a processor core, for example, in a bus-attached Application-Specific Integrated Circuits (ASICs) or accelerator. While offering the possibility of better performance than some software solutions, use of these adjunct circuits remains subject to bus and memory access latencies and messaging overhead, again limiting performance as compared to that achievable within a high-performance processor core. This performance penalty is particularly acute for relatively small messages (e.g., messages fitting within a single message block), which are the majority of SHA messages handled in enterprise servers. The present disclosure addresses these and other design considerations by efficiently implementing hash functions, including associated message block padding, in a processor.

In one embodiment, a processor includes an instruction fetch unit that fetches instructions to be executed, a register file including a plurality of registers for storing source and destination operands, and an execution unit for executing a message padding instruction. The message padding instruction includes an operand field indicating one of the plurality of registers buffering a message block segment of a message block to be padded and a mode field indicating which of a plurality of different hash functions is to be applied to the message block. The execution unit includes a padding circuit configured, based on the message padding instruction, to receive a message block segment from one of the plurality of registers indicated by the operand field of the message padding instruction, where the message block spans multiple registers in the register file. Based on which of the plurality of different hash functions is indicated by the mode field of the message padding instruction, the padding circuit selects a byte location in the message block segment at which to insert at least one padding byte and inserts the at least one padding byte at the byte location within the message block segment. The message block segment as padded by the at least one padding byte is then written back to the register file.

In one embodiment, a method of data processing includes fetching, by an instruction fetch unit of a processor, instructions to be executed by the processor, where the instructions include a message padding instruction including an operand field indicating one of the plurality of registers buffering a message block segment of a message block to be padded and a mode field indicating which of a plurality of different hash functions is to be applied to the message block. Based on receiving the message padding instruction, an execution unit of the processor executes the message padding instruction. Executing the message padding instruction includes receiving, from a register file, a message block segment from one of the plurality of registers indicated by the operand field of the message padding instruction, where the message block spans multiple registers in the register file. Based on which of the plurality of different hash functions is indicated by the mode field of the message padding instruction, a byte location in the message block segment at which to insert at least one padding byte is selected, and the at least one padding byte is inserted at the byte location within the message block segment. The message block segment as padded by the at least one padding byte is written back to the register file.

In one embodiment, the message block includes multiple message block segments and the execution unit is configured to detect, based on an indication in the mode field, which of the multiple message block segments the message block segment is.

In one embodiment, the plurality of different hash functions includes a first hash function and a second hash function, and the execution unit is configured to insert both end-of-message (EOM) padding and end-of-block (EOB) padding in the message block segment based on the mode field indicating the first hash function and is configured to insert EOM padding but not EOB padding in the message block segment based on the mode field indicating the second hash function.

In one embodiment, the operand field of the message padding instruction indicates one of the plurality of registers buffering a length parameter of the message segment, the execution unit is configured to interpret the length parameter differently based on which of the plurality of hash functions is indicated by the mode field.

In one embodiment, the at least one padding byte includes an end-of-message (EOM) padding byte, selecting the byte location includes generating an EOM enable vector having a length corresponding to the message block segment, and inserting the at least one padding byte includes inserting the EOM padding byte at the byte location in the message block segment based on the EOM enable vector.

In one embodiment, the padding circuit includes a select circuit configured to select a value of the EOM padding byte based on which of the plurality of different hash functions is indicated by the mode field of the padding instruction.

In one embodiment, the register file is a first register file including a first plurality of registers, the processor includes a second register file including a second plurality of registers each having a length less than that of the first plurality of registers, and the execution unit is further configured to assemble multiple chunks of the message block segment in multiple registers among the second plurality of registers and transfer all of the multiple chunks into one of the first plurality of registers to form the message block segment. In one embodiment, the processor is further configured to insert end-of-block (EOB) padding into one of the multiple registers among the second plurality of registers prior to transfer of the multiple chunks to said one of the first plurality of registers.

In one embodiment, the at least one padding byte includes an end-of-block (EOB) padding byte, selecting the byte location includes generating an EOB enable vector having a length corresponding to the message block segment, and inserting the at least one padding byte includes inserting the EOB padding byte at the byte location in the message block segment based on the EOB enable vector.

In one embodiment, inserting the at least one padding byte includes logically combining the EOB padding byte with an end-of-message (EOM) padding byte.

In one embodiment, the execution unit includes a hash circuit that is configured, based on a hash instruction, to apply a hash function among the SHA family of hash functions to a padded message block including the message block segment as padded.

In one embodiment, the message block segment is a portion of a message comprising a plurality of message blocks having an identical length of r bits, the message block, as padded, includes r bits, and each of the plurality of registers has a length of less than r bits.

BRIEF DESCRIPTION OF THE SEVERAL VIEWS OF THE DRAWINGS

FIG. 15 illustrates message expansion for a SHA2 hash function having 32-bit words in accordance with an exemplary embodiment;

FIG. 16 depicts an exemplary format for a SHA2 hash instruction in accordance with one embodiment;

FIG. 21A depicts an exemplary unpadded message;

FIG. 21B illustrates an exemplary padded message;

FIGS. 22A-22B depict the assembly of chunks of a message block in a narrower first register file and the transfer of the message block to a wider second register file;

DETAILED DESCRIPTION

Figure 1:
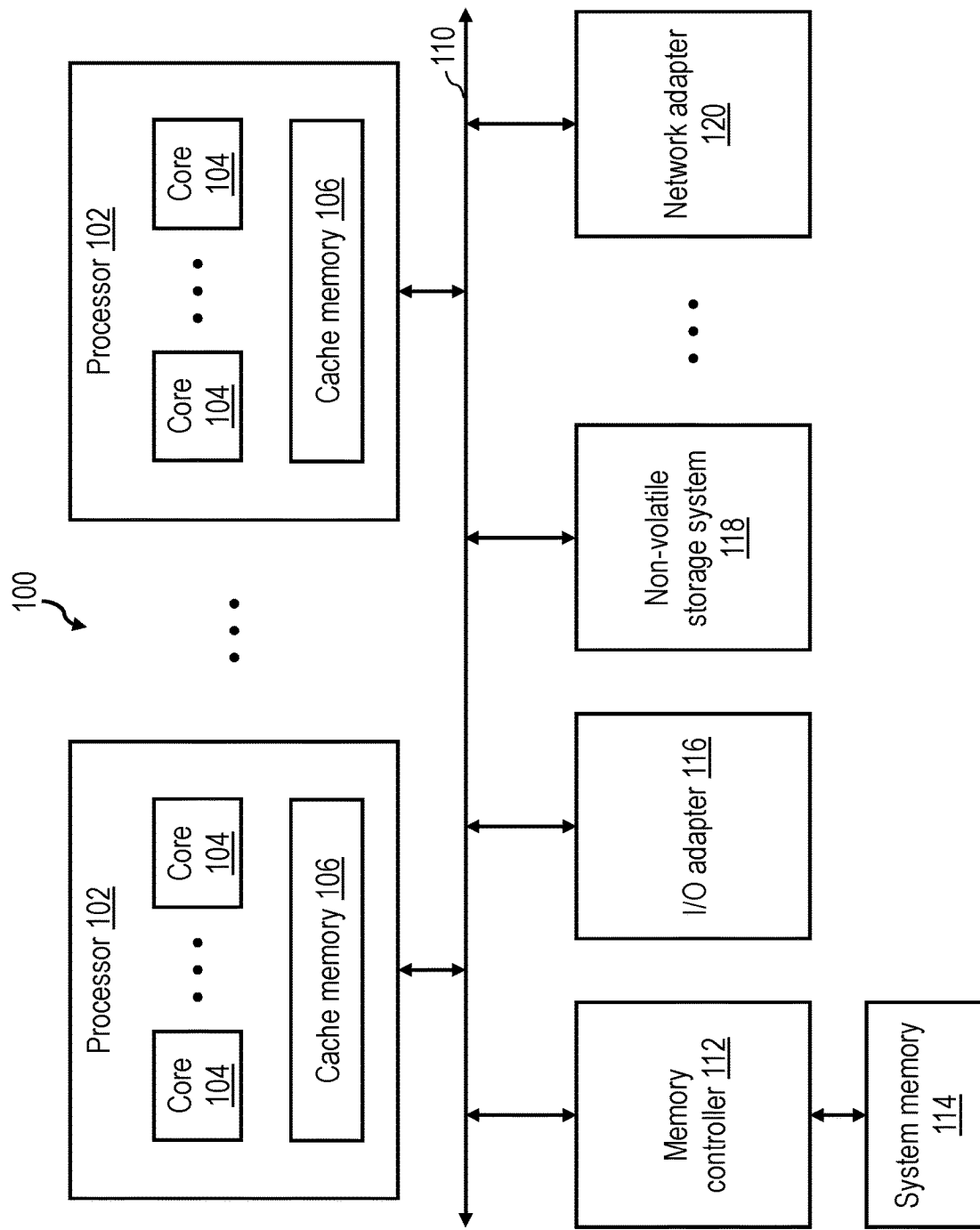
FIG. 1 is a high-level block diagram of a data processing system including a processor in accordance with one embodiment.

With reference now to the figures and in particular with reference to FIG. 1, there is illustrated a high-level block diagram of a data processing system 100 in accordance with one embodiment. In some implementations, data processing system 100 can be, for example, a server computer system (such as one of the POWER series of servers available from International Business Machines Corporation), a mainframe computer system, a mobile computing device (such as a smartphone or tablet), a laptop or desktop personal computer system, or an embedded processor system.

As shown, data processing system 100 includes one or more processors 102 that process instructions and data. Each processor 102 may be realized as a respective integrated circuit having a semiconductor substrate in which integrated circuitry is formed, as is known in the art. In at least some embodiments, processors 102 can generally implement any one of a number of commercially available processor architectures, for example, POWER, ARM, Intel x86, NVidia, Apple silicon, etc. In the depicted example, each processor 102 includes one or more processor cores 104 and cache memory 106 providing low latency access to instructions and operands likely to be read and/or written by processor cores 104. Processors 102 are coupled for communication by a system interconnect 110, which in various implementations may include one or more buses, switches, bridges, and/or hybrid interconnects.

Data processing system 100 may additionally include a number of other components coupled to system interconnect 110. These components can include, for example, a memory controller 112 that controls access by processors 102 and other components of data processing system 100 to a system memory 114. In addition, data processing system 100 may include an input/output (I/O) adapter 116 for coupling one or I/O devices to system interconnect 110, a non-volatile storage system 118, and a network adapter 120 for coupling data processing system 100 to a communication network (e.g., a wired or wireless local area network and/or the Internet).

Those skilled in the art will additionally appreciate that data processing system 100 shown in FIG. 1 can include many additional non-illustrated components. Because such additional components are not necessary for an understanding of the described embodiments, they are not illustrated in FIG. 1 or discussed further herein. It should also be understood, however, that the enhancements described herein are applicable to data processing systems and processors of diverse architectures and are in no way limited to the generalized data processing system architecture illustrated in FIG. 1.

Figure 2:
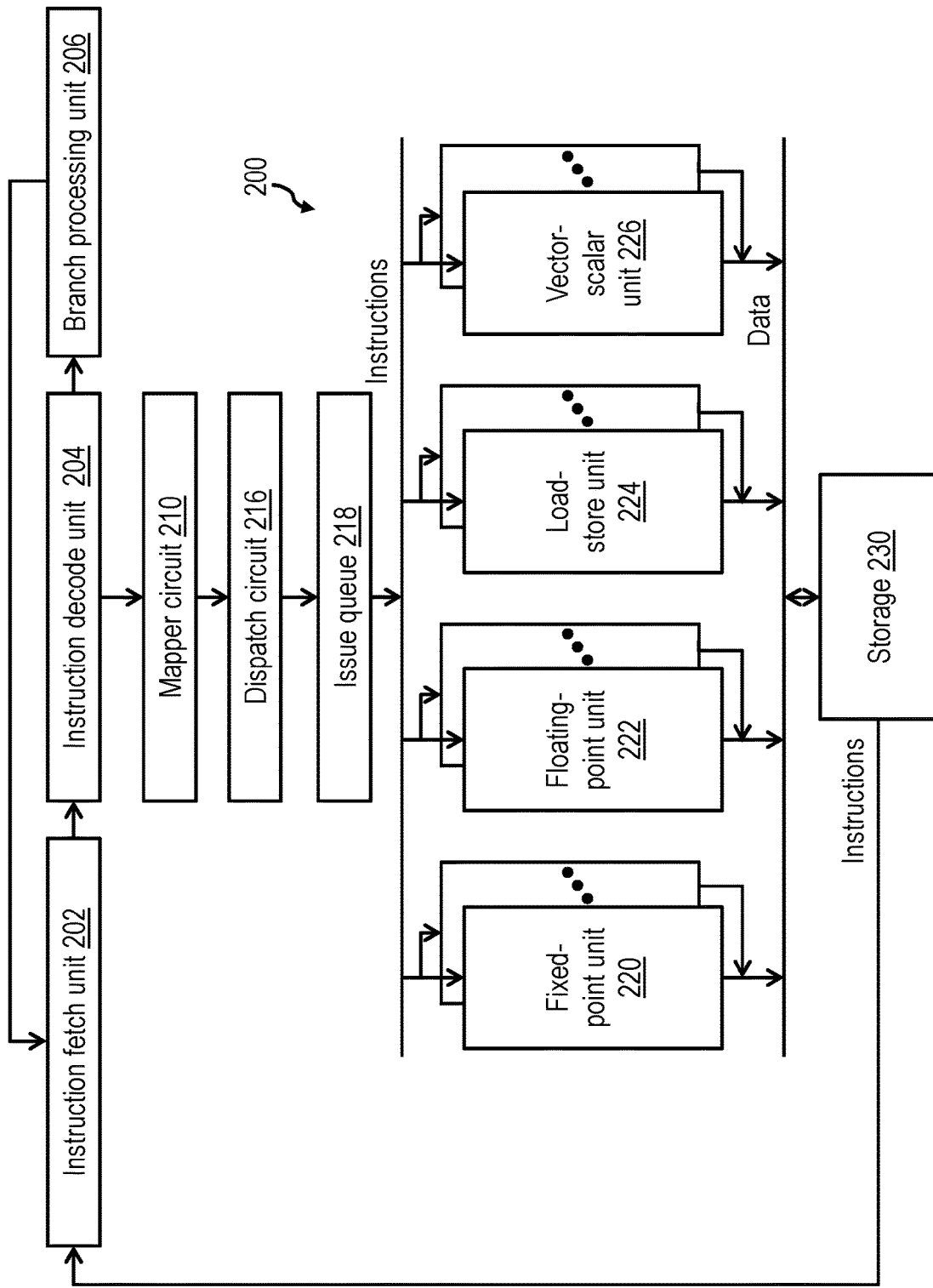
FIG. 2 is a high-level block diagram of a processor core in accordance with one embodiment.

Referring now to FIG. 2, there is depicted a high-level block diagram of an exemplary processor core 200 in accordance with one embodiment. Processor core 200 may be utilized to implement any of processor cores 104 of FIG. 1.

In the depicted example, processor core 200 includes an instruction fetch unit 202 for fetching instructions within one or more streams of instructions from storage 230 (which may include, for example, cache memories 106 and/or system memory 114 from FIG. 1). In a typical implementation, each instruction has format defined by the instruction set architecture of processor core 200 and includes at least an operation code (opcode) field specifying an operation (e.g., fixed-point or floating-point arithmetic operation, vector operation, matrix operation, logical operation, branch operation, memory access operation, cryptographic operation, etc.) to be performed by processor core 200. Certain instructions may additionally include one or more operand fields directly specifying operands or implicitly or explicitly referencing one or more registers storing source operand(s) to be utilized in the execution of the instruction and one or more registers for storing destination operand(s) generated by execution of the instruction. Instruction decode unit 204, which in some embodiments may be merged with instruction fetch unit 202, decodes the instructions retrieved from storage 230 by instruction fetch unit 202 and forwards branch instructions that control the flow of execution to branch processing unit 206. In some embodiments, the processing of branch instructions performed by branch processing unit 206 may include speculating the outcome of conditional branch instructions. The results of branch processing (both speculative and non-speculative) by branch processing unit 206 may, in turn, be utilized to redirect one or more streams of instruction fetching by instruction fetch unit 202.

Instruction decode unit 204 forwards instructions that are not branch instructions (often referred to as "sequential instructions") to mapper circuit 210. Mapper circuit 210 is responsible for the assignment of physical registers within the register files of processor core 200 to instructions as needed to support instruction execution. Mapper circuit 210 preferably implements register renaming. Thus, for at least some classes of instructions, mapper circuit 210 establishes transient mappings between a set of logical (or architected) registers referenced by the instructions and a larger set of physical registers within the register files of processor core 200. As a result, processor core 200 can avoid unnecessary serialization of instructions that are not data dependent, as might otherwise occur due to the reuse of the limited set of architected registers by instructions proximate in program order.

Still referring to FIG. 2, processor core 200 additionally includes a dispatch circuit 216 configured to ensure that any data dependencies between instructions are observed and to dispatch sequential instructions as they become ready for execution. Instructions dispatched by dispatch circuit 216 are temporarily buffered in an issue queue 218 until the execution units of processor core 200 have resources available to execute the dispatched instructions. As the appropriate execution resources become available, issue queue 218 issues instructions from issue queue 218 to the execution units of processor core 200 opportunistically and possibly out-of-order with respect to the original program order of the instructions.

In the depicted example, processor core 200 includes several different types of execution units for executing respective different classes of instructions. In this example, the execution units include one or more fixed-point units 220 for executing instructions that access fixed-point operands, one or more floating-point units 222 for executing instructions that access floating-point operands, one or more load-store units 224 for loading data from and storing data to storage 230, and one or more vector-scalar units 226 for executing instructions that access vector and/or scalar operands. In a typical embodiment, each execution unit is implemented as a multi-stage pipeline in which multiple instructions can be simultaneously processed at different stages of execution. Each execution unit preferably includes or is coupled to access at least one register file including a plurality of physical registers for temporarily buffering operands accessed in or generated by instruction execution.

Those skilled in the art will appreciate that processor core 200 may include additional unillustrated components, such as logic configured to manage the completion and retirement of instructions for which execution by execution units 220-226 is finished. Because these additional components are not necessary for an understanding of the described embodiments, they are not illustrated in FIG. 2 or discussed further herein.

Figure 3:
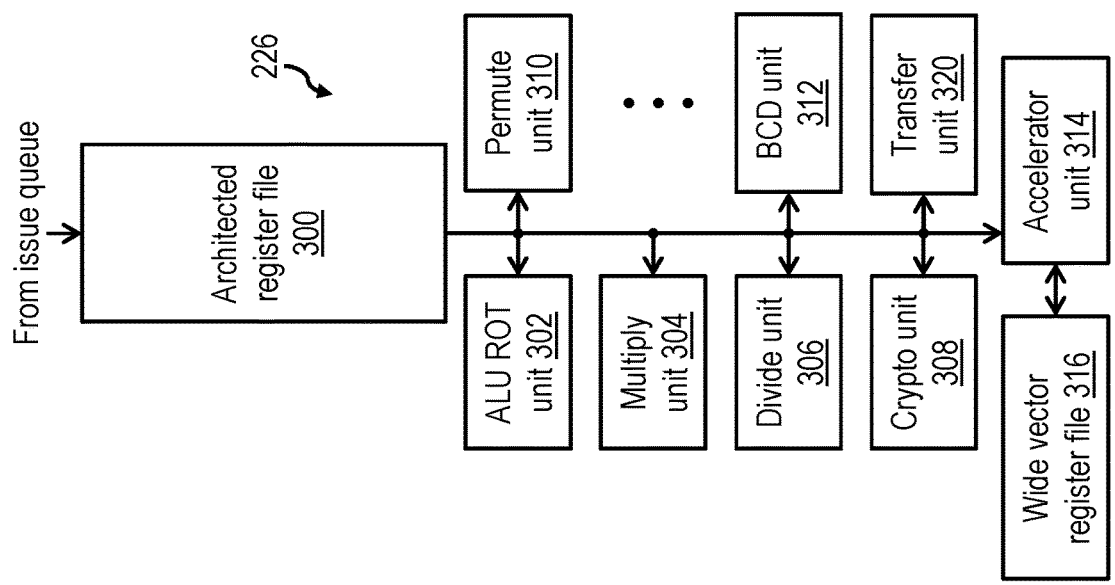
FIG. 3 is a high-level block diagram of an exemplary execution unit of a processor core in accordance with one embodiment.

With reference now to FIG. 3, there is illustrated a high-level block diagram of an exemplary execution unit of a processor 102 in accordance with one embodiment. In this example, a vector-scalar unit 226 of processor core 200 is shown in greater detail. In the embodiment of FIG. 3, vector-scalar unit 226 is configured to execute multiple different classes of instructions that operate on and generate different types of operands. For example, vector-scalar unit 226 is configured to execute a first class of instructions that operate on vector and scalar source operands and that generate vector and scalar destination operands. Vector-scalar unit 226 executes instructions in this first class of instructions in functional units 302-312, which in the depicted embodiment include an arithmetic logic unit/rotation unit 302 for performing addition, subtraction, and rotation operations, a multiply unit 304 for performing binary multiplication, a divide unit 306 for performing binary division, a cryptography unit 308 for performing cryptographic functions, a permute unit 310 for performing operand permutations, and binary-coded decimal (BCD) unit 312 for performing decimal mathematical operations. The vector and scalar source operands on which these operations are performed and the vector and scalar destination operands generated by these operations are buffered in the physical registers of an architected register file 300.

In this example, vector-scalar unit 226 is additionally configured to execute a second class of instructions that cause hashing functions to be performed. Vector-scalar unit 226 executes instructions in this second class of instructions in an accelerator unit 314. The operands on which these hash functions are performed and the operands generated by these hash functions are buffered and accumulated in a wide vector register file 316, which may include, for example, 1024-bit wide physical registers.

In operation, instructions are received by vector-scalar unit 226 from issue queue 218. If an instruction is in the first class of instructions (e.g., vector-scalar instructions), the relevant source operand(s) for the instruction are accessed in architected register file 300 utilizing the mapping between logical and physical registers established by mapper circuit 210 and then forwarded with the instruction to the relevant one of functional units 302-312 for execution. The destination operand(s) generated by that execution are then stored back to the physical register(s) of architected register file 300 determined by the mapping established by mapper circuit 210. If, on the other hand, the instruction is in the second class of instructions (e.g., hash instructions), the instruction is forwarded to accelerator unit 314 for execution with respect to operand(s) buffered in specified registers of wide vector register file 316.

Figure 4:
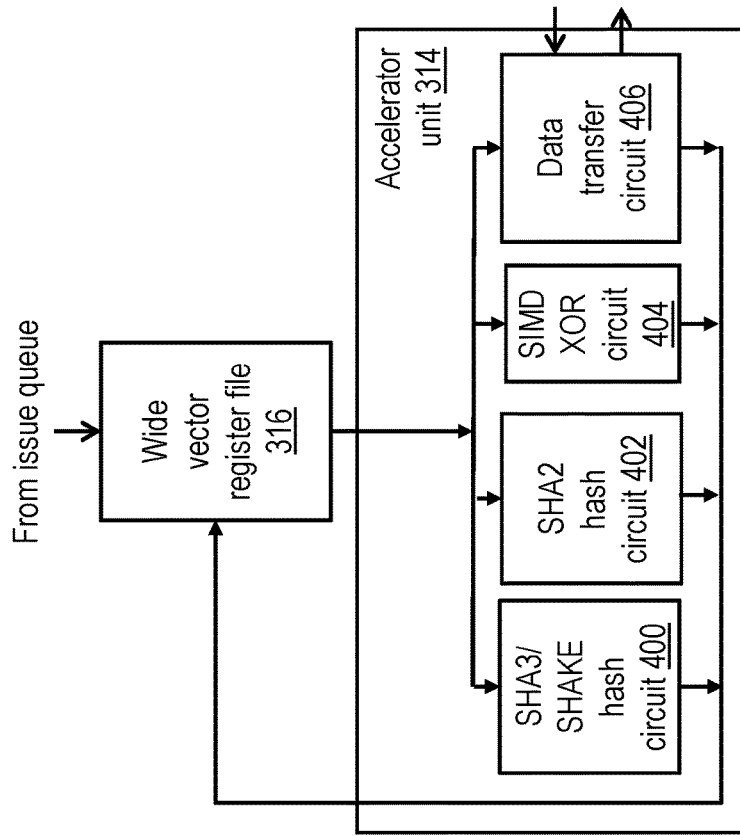
FIG. 4 is a more detailed block diagram of an accelerator unit within a processor core in accordance with one embodiment.

Referring now to FIG. 4, there is depicted a more detailed block diagram of accelerator unit 314 of FIG. 3 in accordance with one embodiment. Accelerator unit 314 includes circuitry for performing, in hardware, a variety of hash functions, including, for example, one or more hash functions defined by the SHA family of standards. In the depicted example, the hash circuitry of accelerator unit 314 includes at least SHA3/SHAKE hash circuit 400 as described below in greater detail with reference to FIG. 11 and a SHA2 hash circuit 402 as described below in greater detail with reference to FIG. 17. Accelerator unit 314 additionally includes a single instruction multiple data (SIMD) exclusive OR (XOR) circuit 404 employed in performing a SHA3/SHAKE hash of a message, as discussed further below. Finally, accelerator unit 314 includes a data transfer circuit 406 that transfers data (e.g., messages to be hashed and message digests) between the memory system (e.g., cache memory 106 and system memory 114) and wide vector register file 316.

Figure 5:
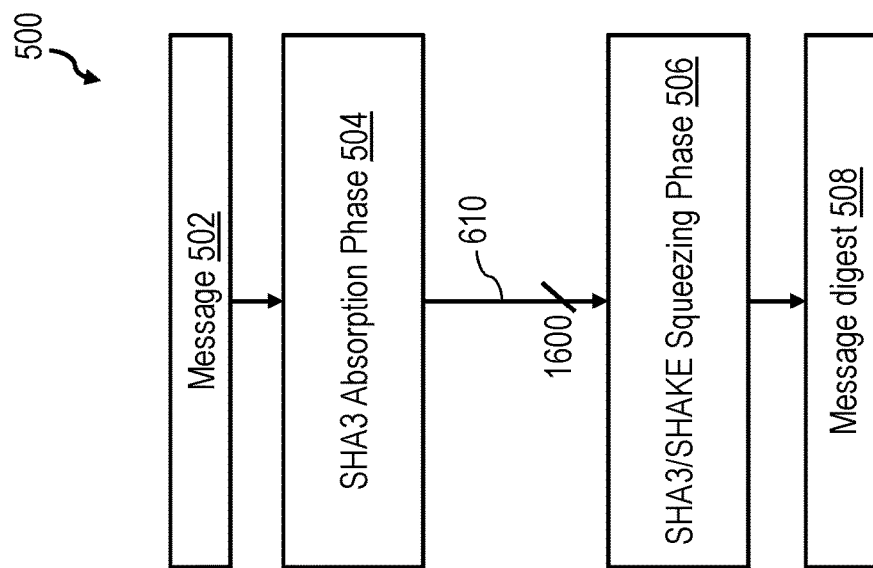
FIG. 5 is a time-space diagram of message hashing in accordance with the SHA-3 standard.
Figure 6:
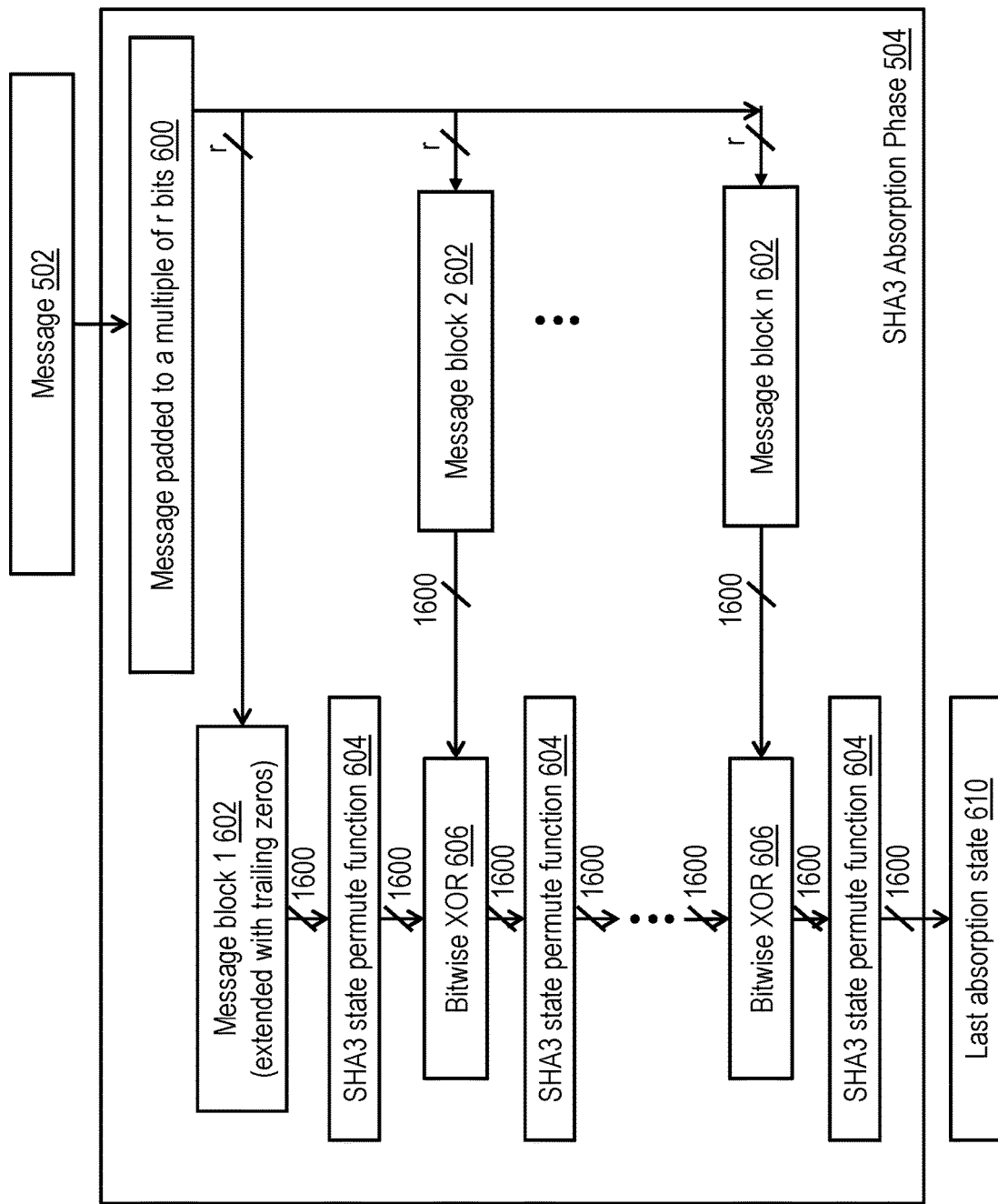
FIG. 6 is a time-space diagram of the absorption phase depicted in FIG. 5.

With reference now to FIG. 5, there is a time-space diagram of a process 500 of message hashing in accordance with the SHA-3 standard. As is known in the art, the SHA-3 standard (i.e., FIPS 202) employs a sponge construction based on a wide random function or random permutation. According to this sponge construction, a message 502 of any arbitrary length (possibly many megabytes) is first processed in an input phase, referred to as the SHA3 absorption phase 504 in sponge terminology. SHA3 absorption phase 504, which is described in greater detail below with reference to FIG. 6, is identical for both SHA3 and SHAKE hash functions. SHA3 absorption phase 504 produces a 1600-bit last absorption state 610, which is then processed in an output phase (referred to as the SHA3/SHAKE squeezing phase 506 in sponge terminology) to generate a message digest 508. SHA3/SHAKE squeezing phase 506, which is described in detail below with reference to FIG. 8, operates differently for SHA3 hash functions and SHAKE hash functions. In particular, SHA3/SHAKE squeezing phase 506 generates fixed-length message digests 508 for the various SHA3 hash functions, but generates variable-length message digests 508 for SHAKE hash functions.

Table I, below, summarizes attributes of four SHA3 hash functions and two SHAKE hash functions defined by the SHA-3 standard and listed in the first column. In Table I, the second column summarizes the size in bits (r) of the message blocks into which the SHA3 absorption phase 504 subdivides variable-length message 502. Message block size r is an integer multiple of bytes in length, and the first message block of each message is byte-aligned. The third column of Table I summaries the size in bits (d) of the message digest 508 output by SHA3/SHAKE squeezing phase 506. It should again be noted that SHAKE-128 and SHAKE-256, unlike the SHA3 hash functions, generate variable length digests of length d'. As noted in the fourth column of Table I, for each hash function specified by the SHA-3 standard, the last absorption state 610 is 1600 bits in length. The fifth column of Table I specifies the differing values of c, a number of lower-order bits passed between iterations of a SHA3 state permute function during the SHA3/SHAKE squeezing phase 506 (see, e.g., FIG. 8). Finally, the sixth column of Table I specifies that each iteration of the SHA3 state permute function employs 24 rounds of permutation per message block (see, e.g., FIG. 7A). In updates to the SHA-3 standard or in non-standard implementations, the number of rounds of permutation may be varied, for example, by decreasing the required number of permutations (e.g., to 12).

TABLE I

| | Message block size r (bits) | Digest size d (bits) | State (bits) | c = 1600 − r (bits) | Rounds of permutation per message block |
|---|---|---|---|---|---|
| SHA3-224 | 1152 | 224 | 1600 | 448 | 24 |
| SHA3-256 | 1088 | 256 | 1600 | 512 | 24 |
| SHA3-384 | 832 | 384 | 1600 | 768 | 24 |
| SHA3-512 | 576 | 512 | 1600 | 1024 | 24 |
| SHAKE-128 | 1344 | d' | 1600 | 256 | 24 |
| SHAKE-256 | 1088 | d' | 1600 | 512 | 24 |

Referring now to FIG. 6, there is depicted a time-space diagram of the SHA3 absorption phase 504 depicted in FIG. 5. As shown, SHA3 absorption phase 504 receives, as input, a message 502 of any arbitrary length. As shown at block 600, message 502 is padded to obtain a length that is an integer multiple of r bits. In many prior art implementations, this padding is accomplished via a high-latency, computationally expensive memory-to-memory move of the entire message 502. In some other prior art implementations, the SHA hash software routine pads message blocks after loading the message block into SIMD registers using a sequence of conventional SIMD instructions. Although these prior art techniques can be utilized herein to perform padding, as described in detail below with reference to FIGS. 21A to 27, this padding can instead be efficiently performed by hardware in processor registers (e.g., wide vector register file 316) in accordance with the disclosed inventions through execution of a padding instruction. Padding message 502 through execution of a padding instruction also allows the padding to be applied to the end of message 502 in a temporally overlapping manner with the processing of message blocks in SHA3 absorption phase 504.

In SHA3 absorption phase 504, each of n (n a positive integer) message blocks of length r composing the padded message is extracted and then zero-extended in the trailing low-order bits to form n 1600-bit extended message blocks 602. The first message block, that is, message block 1 602, forms the input of a SHA3 state permute function 604 defined by the SHA-3 standard. As described below with reference to FIGS. 9 and 11, in accordance with one aspect of the disclosed inventions, SHA3 state permute function 604 is performed in hardware through the execution of a SHA3 hash instruction. The 1600-bit state output of SHA3 state permute function 604 forms a first input of a 1600-bit bitwise XOR function 606, which takes as a second input a next 1600-bit extended message block 602 of the padded message. The result of the bitwise XOR function 606 forms the input of a next iteration of the SHA3 state permute function 604. As shown, this process continues iteratively for each of the message blocks 602 until a final iteration of SHA3 state permute function 604 generates and outputs a 1600-bit last absorption state 610, as previously noted in the description of FIG. 5.

Figure 7B:
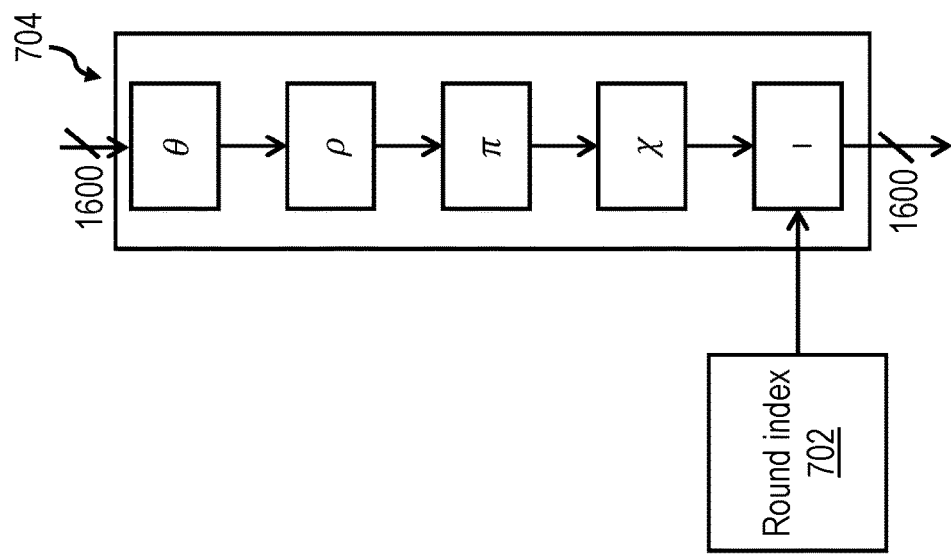
FIG. 7B is a time-space diagram of the SHA3 round function depicted in FIG. 7A.
Figure 7A:
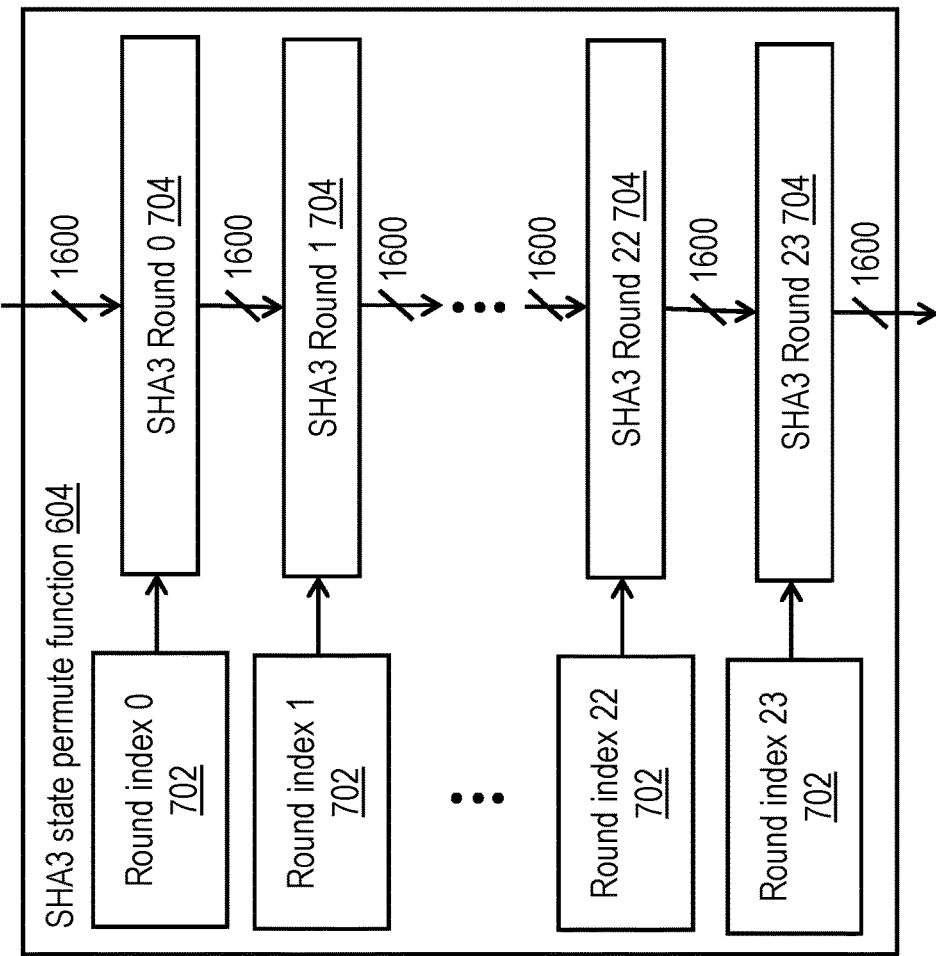
FIG. 7A is a time-space diagram of the SHA3 permute function illustrated in FIG. 6.

With reference now to FIG. 7A, there is illustrated a time-space diagram of the SHA3 permute function 604 illustrated in FIG. 6. SHA3 permute function 604 takes in a 1600-bit input and then processes the 1600-bit input in conjunction with a SHA-3 standard-specified round index 0 702 in a first of 24 rounds of a SHA3 round function 704. This process continues iteratively, with each subsequent round of processing in a SHA3 round function 704 receiving as inputs the 1600-bit output of the preceding SHA3 round function 704 and the relevant SHA3 standard-specified round index 702 (which is a constant). After the 24 rounds of processing within SHA3 state permute function 604 are complete, SHA3 state permute function 604 outputs a 1600-bit state, which either serves as an input to a bitwise XOR function 606, or in the case of the final iteration of SHA3 state permute function 604 within SA3 absorption phase 504, constitutes the last absorption state 610 that serves as the input of SHA3/SHAKE squeezing phase 506.

Referring now to FIG. 7B, there is depicted a time-space diagram of the SHA3 round function 704 depicted in FIG. 7A. As shown, SHA3 round function 704 includes a SHA-3 standard-specified sequence of functions, including in order, five functions referred to in the SHA-3 standard by the Greek letters θ (theta), ρ (rho), π (pi), χ (chi), and ι (iota). The theta function receives and processes the 1600-bit input to round function 704, and the output of each other function except the iota function feeds the next sequential function. Finally, the iota function processes the output of the chi function and the relevant round index 702 to produce the 1600-bit output of the given iteration of SHA3 round function 704. In the prior art, performing round function 704 can take up to 80 cycles utilizing two single instruction multiple data (SIMD) vector pipelines. In accordance with one aspect of the inventions disclosed herein, round function 704 can be completed in a single cycle of a processor core 104 utilizing the SHA3/SHAKE hash circuit 400 of FIG. 11 described below.

Figure 8:
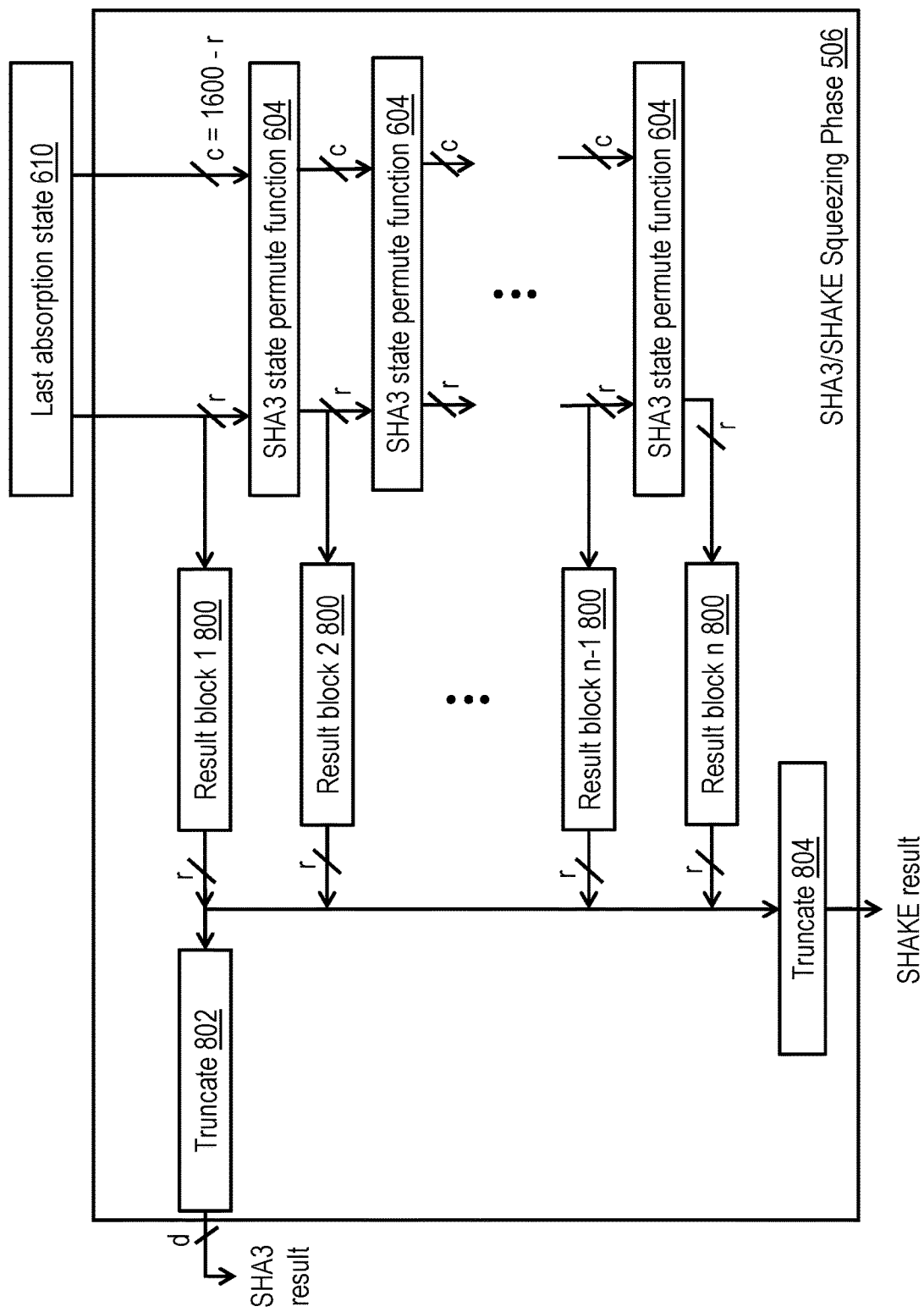
FIG. 8 is a time-space diagram of the SHA3/SHAKE squeezing phase illustrated in FIG. 5.

With reference now to FIG. 8, there is illustrated a time-space diagram of the SHA3/SHAKE squeezing phase 506 illustrated in FIG. 5. As previously described, SHA3/SHAKE squeezing phase 506 receives as input the 1600-bit last absorption phase 610 produced by SHA3 absorption phase 504. To produce a message digest 508 for any of the SHA3 functions defined by the SHA-3 standard, SHA3/SHAKE squeezing phase 506 first extracts the first r high-order bits of last absorption state 610 to form result block 1 800. A truncate function 802 then truncates the r bits of result block 1 800 to retain the high-order d bits forming message digest 508.

To produce a message digest for one of the SHAKE functions defined by the SHA-3 standard, the r bits of result block 1 800 form the r high-order bits of the input of a truncate function 804. These r high-order bits are concatenated with n−1 additional r-bit result blocks 800, each of which is formed from the r high-order bits of the output of an iteration of SHA3 state permute function 604 as previously described with respect to FIG. 7A. Each SHA3 state permute function 604 of SHA3/SHAKE squeezing phase 506 receives a 1600-bit input (i.e., r+c=1600) and generates a 1600-bit output, which, except for the last iteration of SHA3 state permute function 604, feeds a subsequent iteration of SHA3 state permute function 604. Truncate function 804 truncates the r×n input bits to obtain a message digest 508 having a user-specified length of d' bits.

Figure 9:
FIGS. 9-10 illustrate exemplary formats for a SHA3 hash instruction and bitwise exclusive OR (XOR) instruction, respectively, in accordance with one embodiment.
Figure 10:
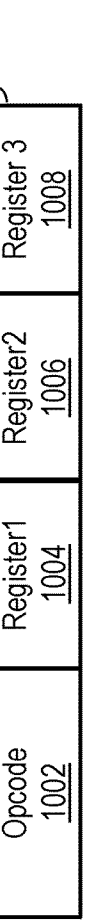

Referring now to FIGS. 9-10, there are illustrated exemplary formats for a SHA3 hash instruction 900 and bitwise exclusive OR (XOR) instruction 1000, respectively, in accordance with one embodiment. In an exemplary embodiment, accelerator unit 314 is configured, responsive to receipt of SHA3 hash instruction 900, to perform a SHA3/SHAKE state permute function in hardware utilizing SHA3/SHAKE hash circuit 400 and, responsive to receipt of bitwise XOR instruction 1000 to perform a 1024-bit bitwise XOR of specified operands utilizing SIMD XOR circuit 404.

In the illustrated embodiment, SHA3 hash instruction 900 includes an opcode field 902 that specifies the particular architecture-specific operation code for a SHA3/SHAKE permute function. SHA3 hash instruction 900 additionally includes one or more register fields 904, 906 for specifying the registers within wide vector register file 316 for the source and destination operands of the SHA3/SHAKE state permute function. For example, in one implementation, SHA3 hash instruction 900 includes a single register field 904 that specifies the first of a pair of adjacent 1024-bit registers that buffer the 1600-bit source operand and, following completion of the SHA3/SHAKE permute function, the 1600-bit destination operand (which overwrites the source operand). In an alternative implementation, SHA3 hash instruction 900 includes two register fields 904, 906 for specifying separate pairs of 1024-bit source and destination registers (in which case the destination operand does not overwrite the source operand).

As noted above, in future updates to the SHA-3 standard or in non-standard implementations, it can be desirable to control the number of rounds of permutation applied by the SHA3 state permute function 604. In such embodiments, the number of rounds SHA3 hash instruction 900 can include a field that either sets the number of rounds of permutation directly or references a register specifying the number of rounds of permutation.

FIG. 10 depicts an exemplary embodiment in which bitwise XOR instruction includes an opcode field 1002 that specifies the particular architecture-specific operation code for a 1024-bit bitwise XOR function. Bitwise XOR instruction 1000 additionally includes three register fields 1004, 1006, and 1008 for separately specifying 1024-bit registers within wide vector register file 316 for buffering two 1024-bit source operands and one 1024-bit destination operand.

Now that the SHA3 and SHAKE hash functions and exemplary instructions for implementing portions of these hash functions have been explained, pseudocode for performing an exemplary SHA3 hash function in hardware is presented. In the pseudocode that follows, the following registers are referenced:

input multiplexers 1100a, 1100b, two 1024-bit state registers 1102a, 1102b, a SHA3 round circuit 1106, and a control circuit 1110 that controls operation of SHA3/SHAKE hash circuit 400 in response to a SHA3 hash instruction 900.

Input multiplexer 1100a has a first input coupled to receive the high-order 1024 bits of a 1600-bit input state from a first register of a register pair in wide vector register file 316 identified by SHA3 hash instruction 900 and a second input coupled to receive the high-order 1024 bits of the 1600-bit round feedback from SHA3 round circuit 1106. Input multiplexer 1100b is similarly structured, with a first input coupled to receive, from a second register in the instruction-specified register pair in wide vector register file 316, a 1024-bit value including the low-order 576 bits of a 1600-bit input state and a second input coupled to SHA3 round circuit 1106 to receive a 1024-bit value including the low-order 576 bits of the 1600-bit round feedback. Control logic 1110 within SHA3/SHAKE hash circuit 400 provides unillustrated select signals to input multiplexers 1100a, 1100b to cause input multiplexers 1100a, 1100b to select the values present at their first inputs prior to SHA3 round 0 and to select the values present at their second inputs following each of SHA3 round0 through SHA3 round 23. The values output by input multiplexers 1100a, 1100b, which are buffered in state registers 1102a, 1102b, respectively, together

```
Rr ← Block length in bytes
RL ← Message length in bytes  // It is assumed RL ≥ Rr & the first block is not padded
Ra ← Starting address of the message
Rb ← Address of message digest resulting from the hash function
Rd ← Message digest length in bytes
Xs ← SHA3 state                // Wide vector register pair
Xm ← Message block             // Wide vector register pair
```

Given these registers, pseudocode for any of the SHA3 (not SHAKE) hash function can be expressed as follows:

form the 1600-bit round input value of SHA3 round circuit 1106, which is configured to perform a SHA3 round function

```
Xs = loadlength(Ra, Rr)       // Load first message block of message and initialize state
Xs = sha3hash(Xs)             // Execute SHA3 hash instruction to perform permute on
                              //   first message block
RL -= Rr                      // Decrement length of unprocessed portion of message
Ra += Rr                      // Increment pointer to next message block in message
While (RL >= Rr)              // Enter loop for processing each remaining message block,
                              //   except for last message block of message
{  Xm = loadlength(Ra, Rr)    // Load next message block
   Xs = wide_xor(Xs, Xm)      // Execute bitwise XOR instruction to combine state and
                              //   current message block
   Xs = sha3hash(Xs)           // Execute SHA3 hash instruction to perform permute on
                              //   current message block
   RL -= Rr                   // Decrement length of unprocessed portion of message
   Ra += Rr                   // Increment pointer to next message block
}
Xm = loadlength(Ra, RL)       // Load last message block, if present (RL can be zero)
Xm = sha3_padding(Xm, RL, sha3-type)  // Execute padding instruction to pad
                              //   message based on remaining message
                              //   length and SHA3 function
Xs = wide_xor(Xs, Xm)         // Execute bitwise XOR instruction to combine state and
                              //   last message block
Xs = sha3 hash(Xs)            // Execute SHA3 hash instruction to perform permute on
                              //   last message block and produce last absorption state
Store_length(Xs, Rb, Rd)      // In SHA3 squeezing phase, truncate the last absorption
                              // state to form the message digest by storing the leading Rd
                              // bytes of Xs to memory at address Rb
```

Figure 11:
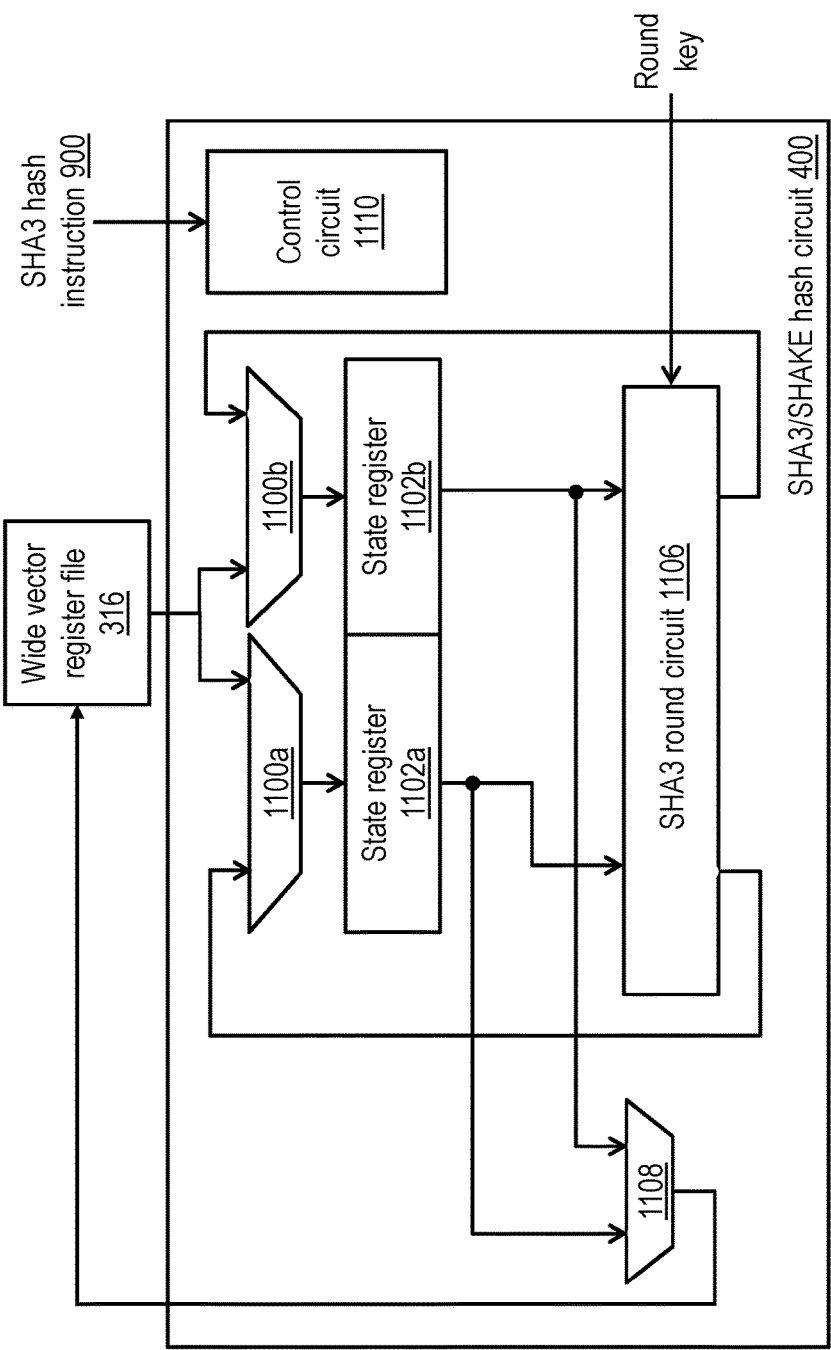
FIG. 11 is a high-level block diagram of an exemplary SHA3/SHAKE hash circuit in accordance with one embodiment.

With reference now to FIG. 11, there is illustrated a high-level block diagram of an exemplary SHA3/SHAKE hash circuit 400 suitable for executing a SHA3 hash instruction 900 in accordance with one embodiment. As shown, SHA3/SHAKE hash circuit 400 includes two 1024-bit two- 704 on the round input value as previously described with reference to FIGS. 7A-7B.

Control circuit 1110 is further configured to sequence SHA3 round circuit 1106 through each of the 24 rounds required by the SHA-3 standard utilizing the correct round indices specified by the SHA-3 standard. Following conclusion of round 23, state registers 1102a, 1102b will respectively hold the high-order 1024 bits and low-order 576 bits of the 1600-bit output state. Control circuit 1110 is further configured, once the output state is obtained, to assert unillustrated select signals to cause an output multiplexer 1108 to write the high-order bits and low-order bits of the 1600-bit output state from state registers 1102a, 1102b, respectively, to an instruction-specified register pair in wide vector register file 316 in two consecutive cycles (assuming wide vector register file 316 has a single write port).

Figure 12:
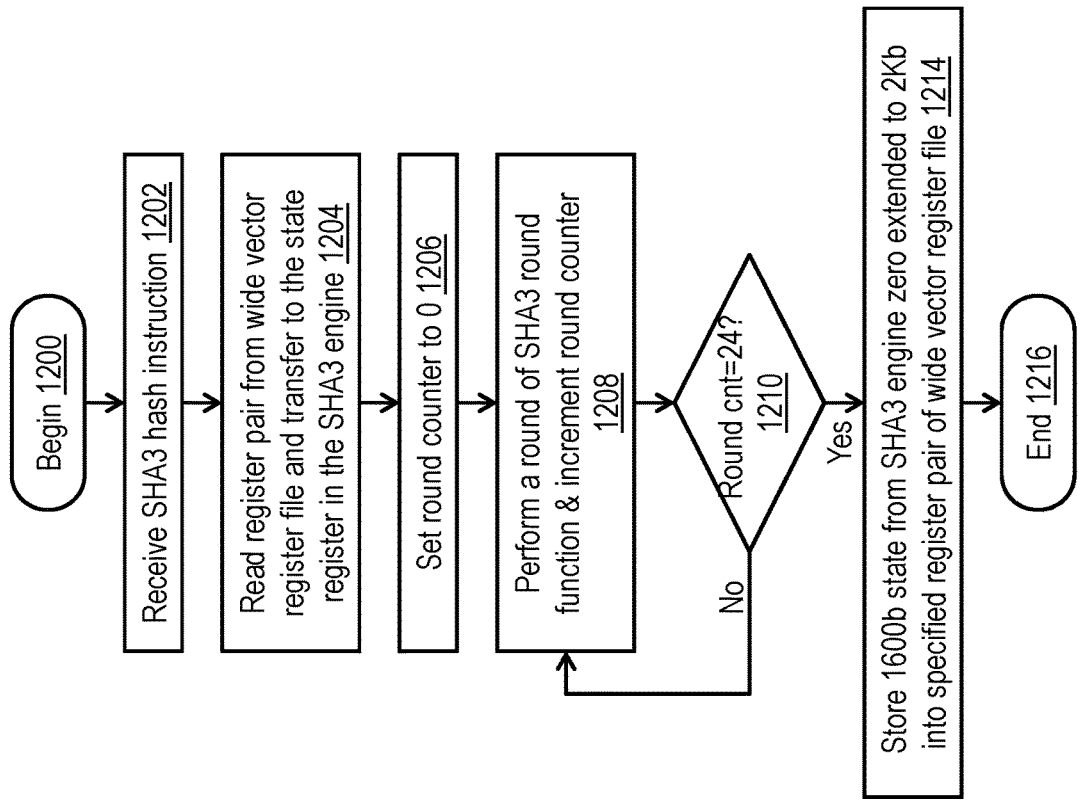
FIG. 12 is a high-level logical flowchart of an exemplary process by which a processor executes a SHA3 hash instruction in accordance with one embodiment.

Referring now to FIG. 12, there is depicted a high-level logical flowchart of an exemplary process for executing a SHA3 hash instruction 900 in accordance with one embodiment. For ease of understanding, the process of FIG. 12 is described with reference to exemplary SHA3/SHAKE hash circuit 400 of FIG. 11.

The process of FIG. 12 begins at block 1200 and then proceeds to block 1202, which illustrates SHA3/SHAKE hash circuit 400 receiving a SHA3 hash instruction 900 specifying a operand register pair within wide vector register file 316. In response to receipt of the SHA3 hash instruction 900, control circuit 1110 causes the contents of the operand register pair to be read out from wide vector register file 316 and loaded into state registers 1102a, 1102b via input multiplexers 1100a, 1100b (block 1204). Control circuit 1110 additionally initializes an internal round counter to 0 (block 1206).

The process then proceeds from block 1206 to block 1208, which illustrates control circuit 1110 directing SHA3 round circuit 1106 to perform an iteration of the SHA3 round function 704 utilizing the round input buffered in state registers 1102a, 1102b and the appropriate SHA-3 standard-specified round index. Control circuit 1110 additionally increments the round counter (block 1208). The result of the processing of SHA3 round circuit 1106 is returned by input multiplexers 1100a, 1100b to state registers 1102, 1102b. As indicated at block 1210, control logic 1110 causes SHA3 round circuit 1106 to perform 24 rounds of processing specified by the SHA-3 standard utilizing the appropriate round indices. When the 24 rounds of processing are complete, control circuit 1110 asserts appropriate select signals to cause output multiplexer 1108 to store the 1600-bit state buffered in state registers 1102a, 1102b (as zero-extended in the low-order bits to form two 1024-bit values) into the operand register pair within wide vector register file 316 specified by SHA3 hash instruction 900 (block 1214). Thereafter, the process of FIG. 12 ends at block 1216.

Figure 13:
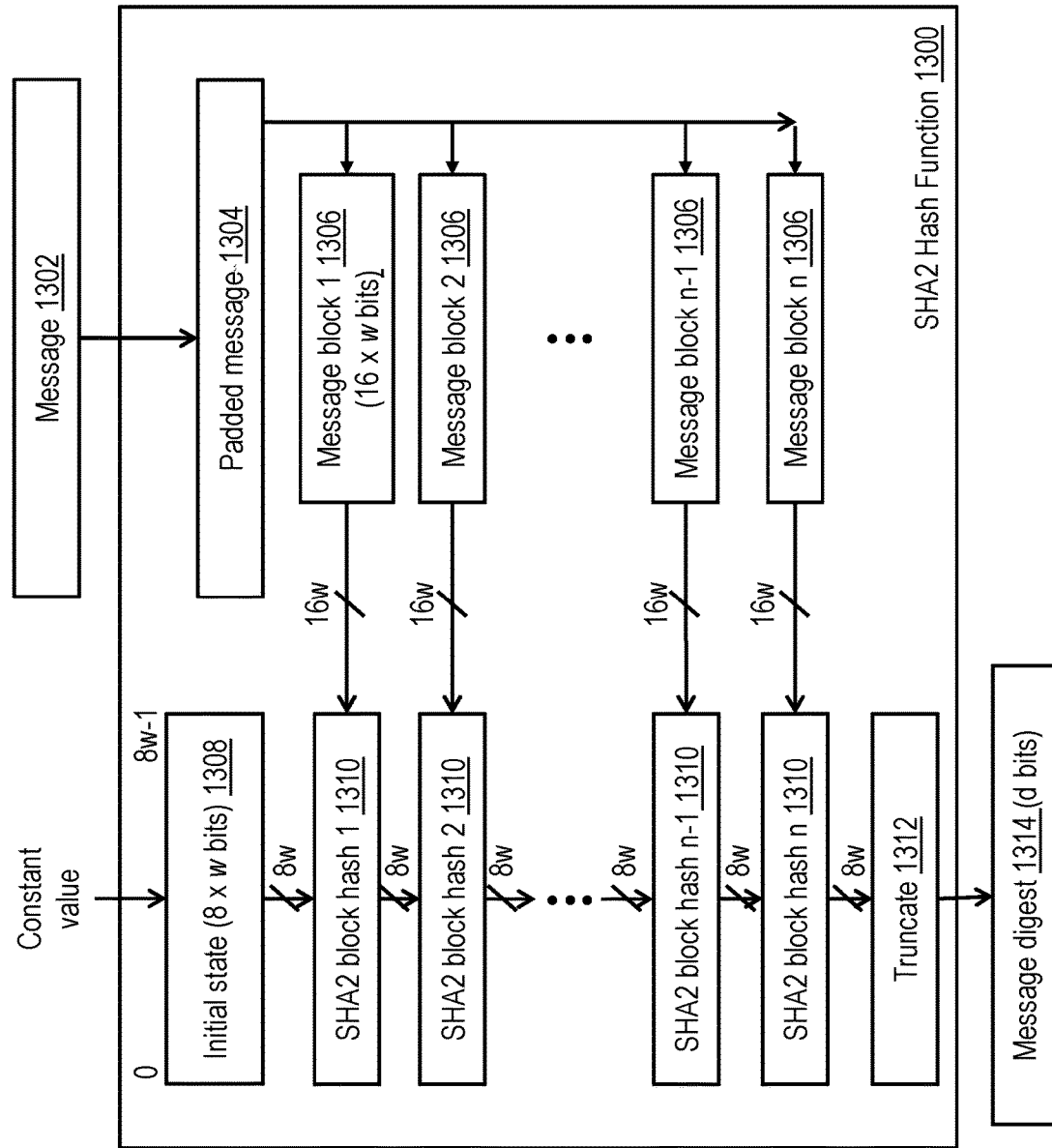
FIG. 13 depicts a time-space diagram of message hashing in accordance with the SHA-2 standard.

With reference now to FIG. 13, there is illustrated a time-space diagram of message hashing in accordance with the SHA-2 standard (FIPS 180-4), which in the embodiment of FIG. 4 is performed by SHA2 hash circuit 402. Table II, below, summarizes attributes of six SHA2 hash functions defined by the SHA-2 standard and listed in the first column. In Table II, the second column summarizes the message block size (r) in bits. Message block size r is an integer multiple of bytes in length, and the first message block of the message is byte-aligned. The third column of Table II summaries the fixed size in bits (d) of the message digest resulting from each SHA2 hash function. The fourth column of Table II species the size in bits of the state for each SHA2 hash function, and the fifth column of Table II indicates the number of rounds of processing (i.e., 64 or 80) employed in each SHA2 hash function (see, e.g., FIG. 14). Finally, the sixth column of Table II specifies the word size, in bits, employed for each SHA2 hash function. Note that for all variants, the state size is 8 times the word size (i.e., comprises 8 words), and the size of the message block is 16 times the size of a word (i.e., comprises 16 words). As described below, in accordance with one aspect of the disclosed inventions, SHA2 hash functions employing a 32-bit word size and SHA2 hash functions employing a 64-bit word size are processed along the same dataflow by virtue of the message expansion applied to words of SHA2-224 and SHA2-256 hash functions, as described below with reference to FIG. 15.

TABLE II

|  | Message block size r (bits) | Digest size d (bits) | State (bits) | Rounds | Word size w (bits) |
| --- | --- | --- | --- | --- | --- |
| SHA2-224 | 512 | 224 | 256 | 64 | 32 |
| SHA2-256 | 512 | 256 | 256 | 64 | 32 |
| SHA2-384 | 1024 | 384 | 512 | 80 | 64 |
| SHA2-512 | 1024 | 512 | 512 | 80 | 64 |
| SHA2-512/224 | 1024 | 224 | 512 | 80 | 64 |
| SHA2-512/256 | 1024 | 256 | 512 | 80 | 64 |

As shown in FIG. 13, a SHA2 hash function 1300 receives, as one input, a message 1302 of any arbitrary length (e.g., possibly megabytes in length). As shown at block 1304, message 1302 is padded to obtain a length that is an integer multiple of r bits. As discussed above with reference to FIG. 6, this padding can be efficiently performed by hardware in processor registers (e.g., wide vector register file 316) rather than through a memory move through execution of a padding instruction. Padding message 1302, and specifically, padding the last message block(s) of the message 1302, through execution of a padding instruction also allows the padding to be applied to the end of message 1302 in a temporally overlapping manner with processing of message blocks by SHA2 hash function 1300. Each of n (n a positive integer) message blocks of length r (where r=16×w) composing the padded message produced by block 1304 is extracted to form one of n 16×w-bit message blocks 1306.

In addition to message 1302, SHA2 hash function 1300 also receives as an input a SHA-2-specified constant value of 8×w bits. As is known in the art, this constant value, which can be accessed from architected register file 300, varies between SHA2 hash function sand forms an 8×w-bit initial state 1308. Initial state 1308 and the first message block, that is, message block 1 1306, form two inputs of a SHA2 block hash function 1 1310 defined by the SHA-2 standard. As described below with reference to FIGS. 16 and 17, in accordance with one aspect of the disclosed inventions, SHA2 block hash function 1310 is performed in hardware through the execution of a SHA2 hash instruction. The 8×w-bit state output by SHA2 block hash 1 function 1310 forms a first input of a SHA2 block hash function 2 1310, which takes as a second input a next 16×w-bit message block 2 1306. The result of the SHA2 block hash function 2 130 forms the input of a next iteration of the SHA2 block hash function 1310. As shown, this process continues iteratively for each of the message blocks 602 until a final nth iteration of SHA2 block hash function 1310 generates and outputs a 8×w-bit last state, which is truncated by truncate function 1312 to produce a message digest 1314 of d bits.

Figure 14:
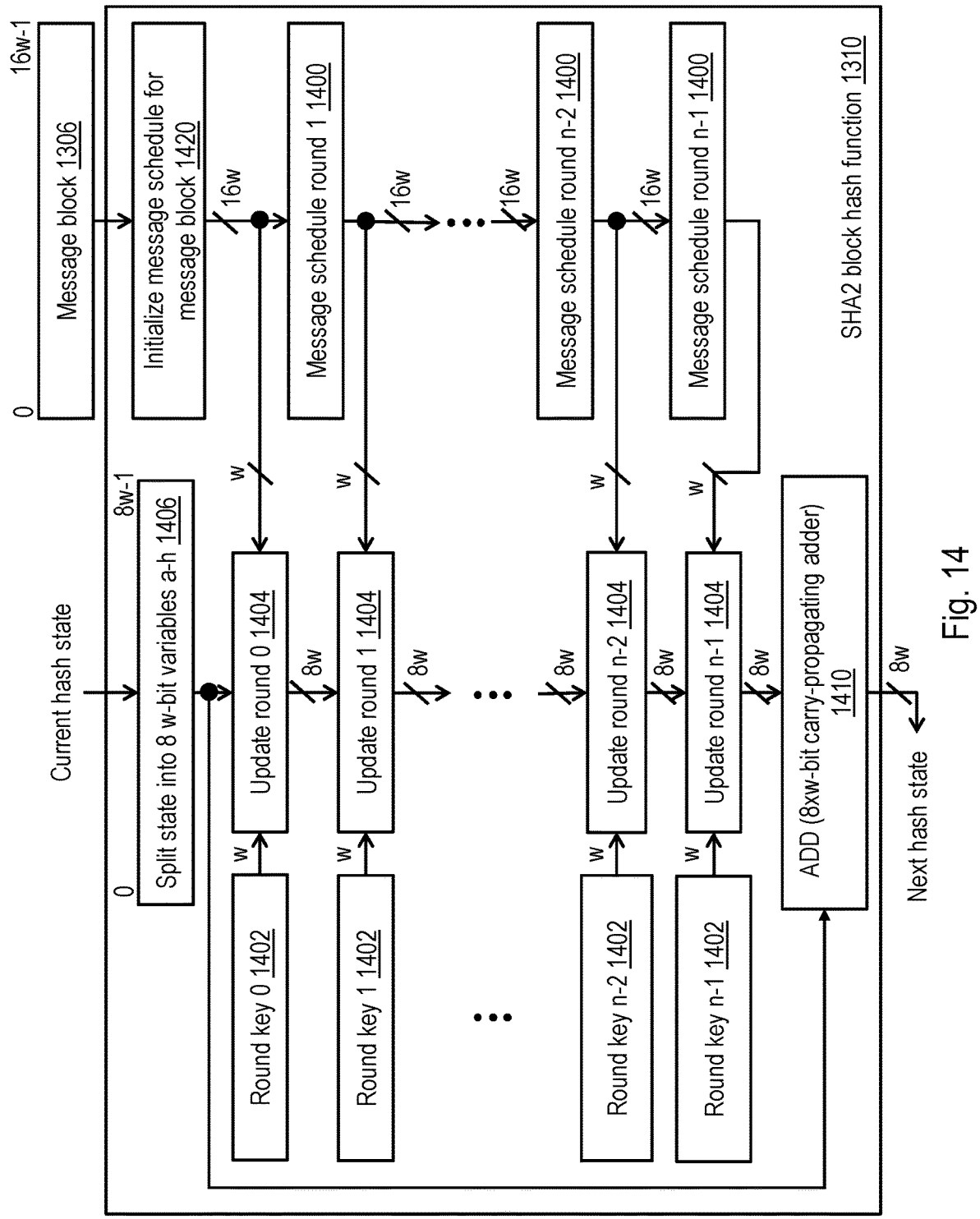
FIG. 14 is a time-space diagram of the SHA2 block hash function illustrated in FIG. 13.

Referring now to FIG. 14, there is depicted a time-space diagram of the SHA2 block hash function 1310 illustrated in FIG. 13. SHA2 block hash function 1310 takes in a 16×w-bit message block 1306 and, as shown at block 1420, initializes a 16×w-bit message schedule for the message block 1306. SHA2 block hash function 1310 then processes the 16×w-bit message schedule through n rounds of processing in message schedule round function 1400, with the 16×w-bit output of each of rounds 1 to n−2 serving as the input to a next round of message schedule processing.

As shown, SHA2 block hash function 1310 also receives as an input the 8×w-bit current hash state (i.e., either initial state 1308 or the output of a previous SHA2 block hash function 1310). As indicated at block 1406, SHA2 block hash function 1310 splits this 8×w-bit current hash state into 8 w-bit variables a to h. SHA2 block hash function 1310 then processes the current hash state through n rounds of processing by update round function 1404. Initial update round 0 1404 takes as additional inputs a SHA-2 specified w-bit round key 0 1402 and the w high order bits of a 16×w-bit initialization 1420 of the message schedule. Each succeeding iteration of update round function 1404 takes as inputs the state generated by the preceding iteration of update round function 1404, the w high-order bits of the 16×w-bit output of the corresponding iteration of message schedule round function 1400, and a SHA-2 specified w-bit round key 1402. The hash state output by update round function n−1 1404 is added to the input hash state by a 8×w-bit carry-propagating add function 1410 to generate a next hash state.

With reference now to FIG. 15, message expansion for a SHA2 hash function in accordance with an exemplary embodiment is illustrated. As noted above with reference to Table II and FIG. 13, embodiments of the disclosed inventions preferably support processing of SHA2 hash functions of differing word sizes w along common data paths by expanding the message words and initial hash states of those SHA2 hash functions employing smaller word sizes. This expansion can be performed, for example, at blocks 1304 and 1308 of FIG. 13. FIG. 15 illustrates a specific example in which each of the sixteen 32-bit words 1502 of a SHA2-224 or SHA2-256 input message 1500 is expanded to form a corresponding one of sixteen 64-bit double words 1506 of an output message 1504. In this example, each 64-bit double word 1506 is formed by concatenating a 32-bit word of input message 1500 in the high-order half of the 64-bit double word 1506 with a 32-bit zero word 1508 in the low-order half of the double word 1506. The resulting output message 1504 can then be processed by a SHA2 hash circuit in the same manner as messages employing 64-bit words.

Referring now to FIG. 16, there is depicted an exemplary format for a SHA2 hash instruction 1600 in accordance with one embodiment. In an exemplary embodiment, accelerator unit 314 is configured, responsive to receipt of SHA2 hash instruction 1600, to perform a SHA2 block hash function 1310 in hardware utilizing SHA2 hash circuit 402.

In the illustrated embodiment, SHA2 hash instruction 1600 includes an opcode field 1602 that specifies the particular architecture-specific operation code for a SHA2 block hash function. SHA2 hash instruction 1600 additionally includes one or more operand register fields 1604, 1606 for specifying the operand registers within wide vector register file 316 for the source and destination operands of the SHA2 block hash function. For example, in one implementation, SHA2 hash instruction 1600 includes a register field 1604 that specifies the 1024-bit register that buffers the input current hash state and, following completion of the SHA2 block hash function, buffers the output current hash state (which overwrites the input current hash state). In addition, SHA2 hash instruction 1600 includes register field 1606 that buffers a current message block to be processed. SHA2 hash instruction 1600 further includes a mode field 1608 indicating whether the SHA2 hash function to be performed employs 32-bit or 64-bit words.

Now that the SHA2 hash functions and an exemplary instruction for implementing portions of the SHA2 hash functions have been explained, pseudocode for performing an exemplary SHA2 hash function (i.e., SHA2-512) in hardware is presented. In the SHA2-512 hash function, each message block is 1024 bits in length, and the hash state and message digest are each 512 bits in length. In the pseudocode that follows, the following registers are referenced:

```
Rl ← message length in bits
RL ← message length in bytes; assumed to be ≥ 128 bytes so first message block is not
    padded
Ra ← starting address of message
Ri ← address of initial state
Rb ← address of the message digest resulting from hash function
Rd ← message digest length in bytes
Xs ← SHA2 state                          // wide vector register
Xm ← current message block               // wide vector register
```

Given these registers, pseudocode for performing the SHA2-512 hash function can be expressed as follows:

```
Xs = load(Ri, 64)              // Load initial state of 64 bytes
Xm = load(Ra, 128)             // Load first (full) message block
Xs = sha2hash(Xs, Xm, 64-bit)  // Execute SHA2 hash instruction to perform block
                               //   hash function
RL − = 128                     // Decrement message length to be processed
Ra += 128                      // Advance pointer to next message block
While (RL > = 128)             // Loop through remaining message blocks, except
                               //   last message block
{   Xm = load(Ra, 128)         // Load next message block (full size)
    Xs = sha2hash(Xs, Xm, 64-bit)  // Execute SHA2 hash instruction to perform block
                                   //   hash function
    RL − = 128                 // Decrement message length to be processed
    Ra += 128                  // Advance pointer to next message block
}
```

```
Xm = loadlength(Ra, RL)        // Load last message block, if present (RL can be zero)
Xm = sha2_EOM_pad(Xm, RL)      // Append SHA2 EOM byte to end of message
                               //   block
If (RL > 111) then             // If padding crosses two message blocks,
{  Xs = sha2hash(Xs, Xm, 64-bit)  //   execute SHA2 hash instruction to perform block
   Xm = force-to-zero          //   hash function and zero last message block
}
Xm = sha2_EOB_pad(Xm, RI)      // Insert EOB in last block of the padded message
Xs = sha2hash(Xs, Xm, 64-bit)  // Execute SHA2 hash instruction to perform block
                               //   hash function on last message block
Store(Xs, Rb, 64)              // Truncate state to leading 64 bytes of Xs to obtain
                               //   message digest and store to memory at address
                               //   Rb
```

Figure 17:
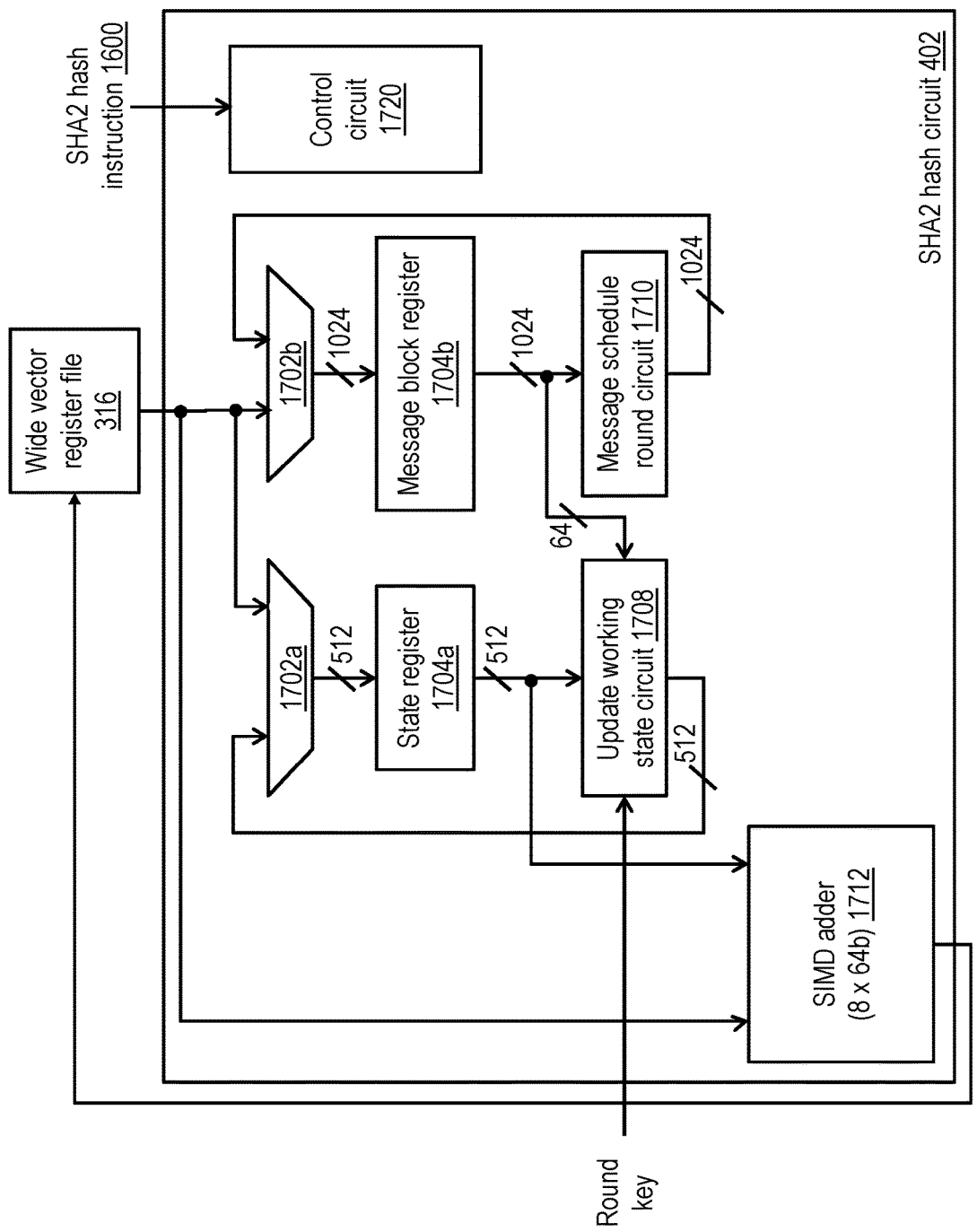
FIG. 17 is a high-level block diagram of an exemplary SHA2 hash circuit in accordance with one embodiment.

With reference now to FIG. 17, there is illustrated a high-level block diagram of an exemplary embodiment of SHA2 hash circuit 402 of FIG. 4 that is suitable for executing a SHA2 hash instruction 1600. As shown, SHA2 hash circuit 402 includes a 512-bit two-input state multiplexer 1702a, a 1024-bit two-input message multiplexer 1702b, a 512-bit state register 1704a, a 1024-bit message block register 1704b, an update working state circuit 1708, a message schedule round circuit 1710, and a control circuit 1720 that controls operation of SHA2 hash circuit 402 in response to a SHA2 hash instruction 1600.

In this example, the first input of state multiplexer 1702a is coupled to receive, from the register in wide vector register file 316 specified by register field 1604 of SHA2 hash instruction 1600, a current hash state held in the 512 high-order bits of the register. The second input of state multiplexer 1702a is coupled to the output of update working state circuit 1708. Message multiplexer 1702b is similarly configured, with a first input coupled to receive a message block from a register in wide vector register file 316 specified by register field 1606 of SHA2 hash instruction 1600 and a second input coupled to receive the 1024-bit round feedback from message schedule round circuit 1710. Control logic 1720 within SHA2 hash circuit 400 provides unillustrated select signals to multiplexers 1702a, 1702b to cause multiplexers 1702a, 1702b to select the values present at the first inputs prior to update round 0 function 1404 and to select the values present at the second inputs following each of update round 0 function through SHA2 block hash n function. The values output by multiplexer 1702a, 1702b are temporarily buffered in state and message block registers 1704a, 1704b, respectively. The message block buffered in message block register 1704b forms the input of message schedule round circuit 1710, which implements message schedule round function 1400 of FIG. 14. The 64 high-order bits from the message block register 1704b and the 512-bit state in state register 1704a form the two inputs of update working state circuit 1708, which is configured to perform an update round function 1404 as previously described with reference to FIG. 14.

Control circuit 1720 is further configured to sequence update working state circuit 1708 through each of the n rounds utilizing the correct round index specified by the SHA-2 standard. Following conclusion of the last round n−1, state register 1704a will hold a 512-bit hash state. Control circuit 1720 is further configured, once the output hash state is obtained, to cause single instruction multiple data (SIMD) adder 1712 to add the hash state read from state register 1704a with the input hash state read from wide vector register field 316 and to store the result, which is the next hash state, back to wide vector register file 316, as described above with respect to add function 1410 of FIG. 14. Those skilled in the art will appreciate that in differing implementations, SIMD adder 1712 can either be implemented as a dedicated component of SHA2 hash circuit 402 or as a separate pipeline that can be shared, for example, by multiple hash circuits.

Figure 18:
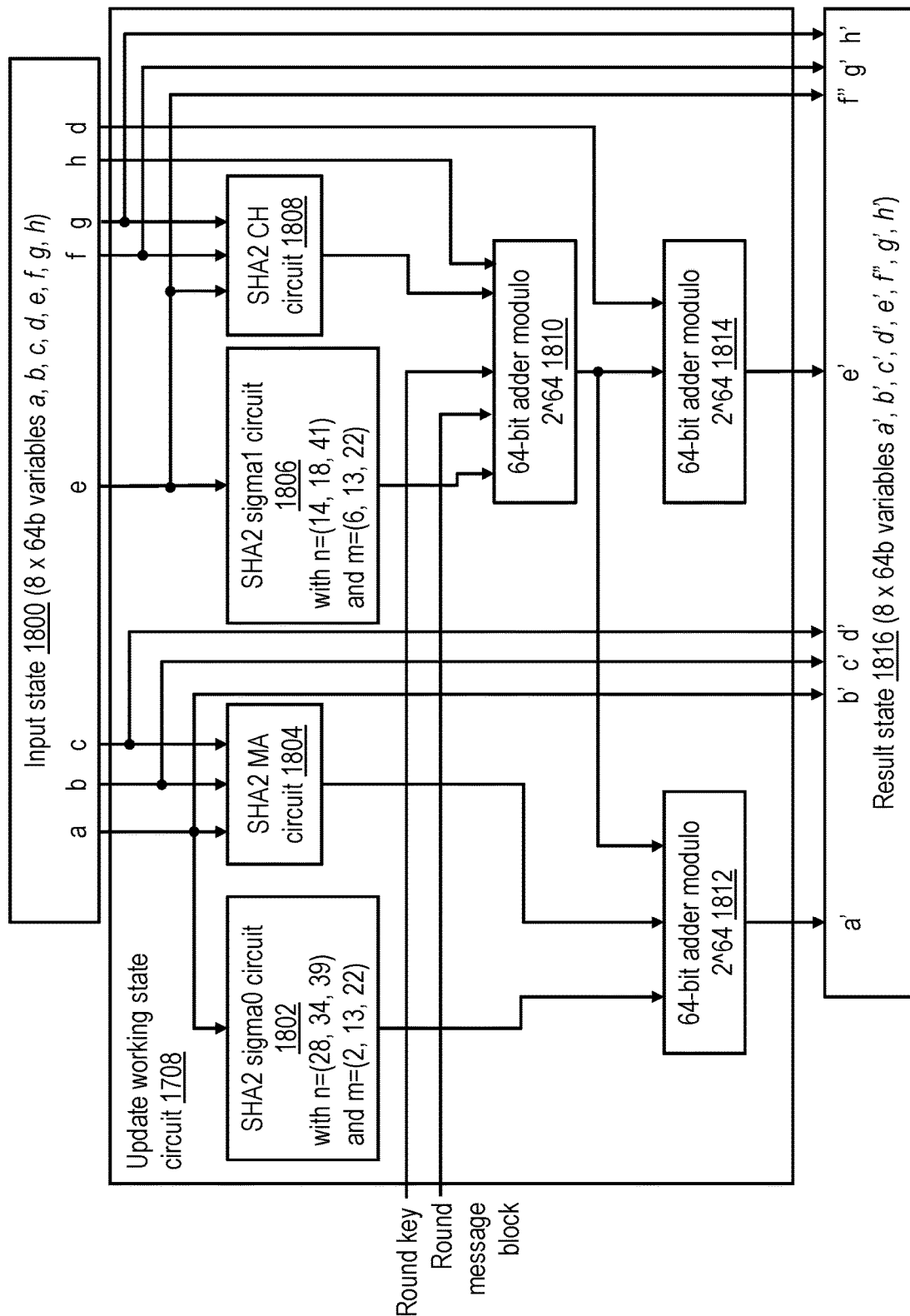
FIG. 18 is a high-level block diagram of an exemplary update working state circuit from FIG. 17 in accordance with one embodiment.

Referring now to FIG. 18, there is depicted a more detailed block diagram of an exemplary update working state circuit 1708 from FIG. 17 in accordance with one embodiment. In this embodiment, the 512-bit state buffered within state register 1704a, which is received as one input of update working state circuit 1708, is split into eight 64-bit variables referred to in the SHA-2 standard as variables a to h, as shown at block 1800. Update working state circuit 1708 includes two sigma function circuits, namely, SHA2 sigma0 circuit 1802 and SHA2 sigma1 circuit 1806, as well as a SHA2 MA circuit 1804, and a SHA2 CH circuit 1808, which each performs a respective function defined by the SHA-2 standard. Update working state circuit 1708 additionally includes three 64-bit adders 1810, 1812, and 1814. SHA2 sigma0 circuit 1802 applies a sigma function with n (n1, n2, n3)=(28, 34, 39) and m (m1, m2, m3)=(2, 13, 22) to variable a to produce a first input of adder 1812. Variables a, b, and c are processed by SHA2 MA circuit 1804 to produce a second input of adder 1812. SHA2 sigma1 circuit 1806 applies a sigma function with n (n1, n2, n3)=(14, 18, 41) and m (m1, m2, m3)=(6, 13, 22) to variable e to produce a first input among the five inputs of adder 1810. Variables e, f and g are processed by SHA2 CH circuit 1808 to produce a second input of adder 1810. Adder 1810 adds to these two inputs the relevant round key, the round message block, and variable d to produce a sum that forms a first input of adder 1814 and a third input of adder 1812.

Update working state circuit 1708 generates a 512-bit result state 1816 composed of eight 64-bit variables a' to h'. Variable a' of result state 1816 is formed by the output of adder 1812, variables b', c', and d' are respectively formed of variables a, b, and c of input state 1800, and variables f', g', and h' are respectively formed of variables e, f and g of input state 1800. Remaining variable e' is formed by the sum of the output of adder 1810 and variable d of input state 1800.

It should be noted that the 32-bit to 64-bit expansion of the words of SHA-2 messages described above with reference to FIG. 15 does not impact the design of (is transparent to) SHA2 MA circuit 1804, SHA2 CH circuit 1808, and modular adders 1812, 1814. The trailing zero expansion of SHA2 messages employing 32-bit words only impacts SHA2 sigma circuits 1802, 1806, as described in greater detail below with reference to FIG. 19.

Figure 19:
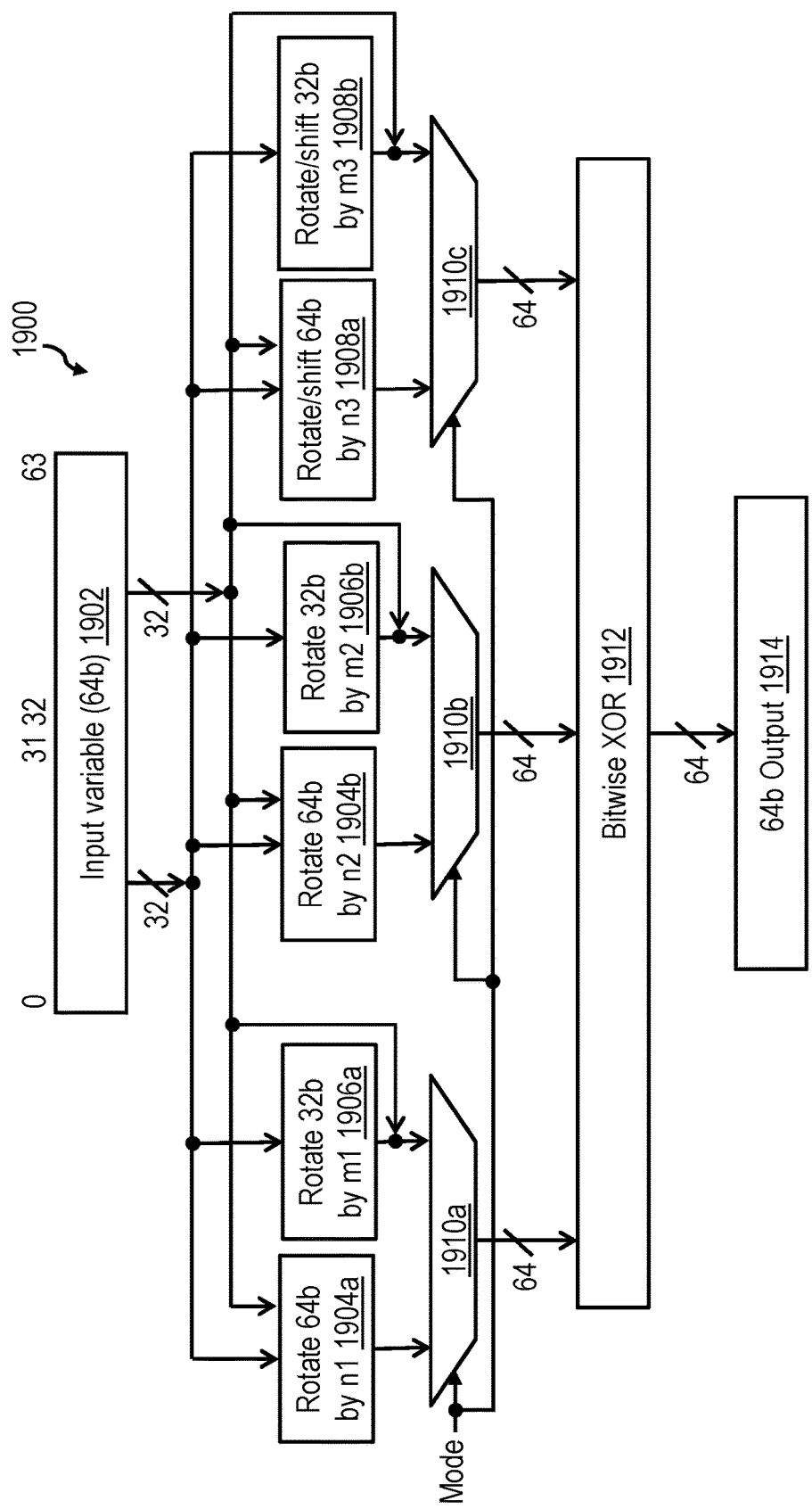
FIG. 19 is a high-level block diagram of an exemplary embodiment of a SHA2 sigma circuit as shown in FIG. 18.

FIG. 19 is a more detailed block diagram of an exemplary embodiment of a SHA2 sigma circuit 1900, which can be utilized to implement SHA2 sigma0 circuit 1802 and SHA2 sigma1 circuit 1806 of FIG. 18. SHA2 sigma circuit 1900 receives a 64-bit input variable 1902 including 32 high-order bits (bits 0 to 31) and 32 low-order bits (bits 32 to 63).

SHA2 sigma circuit 1900 includes a 64-bit rotate circuit 1904a that rotates the 64-bit input variable 1902 by n1 bits (i.e., 28 bits for SHA2 sigma0 circuit 1802 and 14 bits for SHA2 sigma1 circuit 1806) to obtain a first 64-bit input of multiplexer 1910a. SHA2 sigma circuit 1900 additionally includes a 32-bit rotate circuit 1906a that rotates the 32 high-order bits of input variable 1902 by m1 bits (i.e., 2 bits for SHA2 sigma0 circuit 1802 and 6 bits for SHA2 sigma 1 circuit 1806) to obtain, when concatenated with the 32 low-order bits of input variable 1902, a second 64-bit input of multiplexer 1910a. Multiplexer 1910a selects between its first input and second input based on a mode signal determined by mode field 1608 of the relevant SHA2 hash instruction 1600. That is, multiplexer 1910a selects the first input if the mode signal indicates mode field 1608 is set to indicate a SHA2 hash function that utilizes 64-bit words and selects the second input if the mode signal indicates mode field 1608 is set to indicate a SHA2 hash function that utilizes 32-bit words.

SHA2 sigma circuit 1900 additionally includes a 64-bit rotate circuit 1904b that rotates the 64-bit input variable 1902 by n2 bits (i.e., 34 bits for SHA2 sigma0 circuit 1802 and 18 bits for SHA2 sigma1 circuit 1806) to obtain a first 64-bit input of multiplexer 1910b. SHA2 sigma circuit 1900 also includes a 32-bit rotate circuit 1906b that rotates the 32 high-order bits of input variable 1902 by m2 bits (i.e., 13 bits for both SHA2 sigma0 circuit 1802 and SHA2 sigma 1 circuit 1806) to obtain, when concatenated with the 32 low-order bits of input variable 1902, a second 64-bit input of multiplexer 1910b. Multiplexer 1910b selects between its first input and second input based on the mode signal. In particular, multiplexer 1910b selects the first input if the mode signal indicates mode field 1608 is set to indicate a SHA2 hash function that utilizes 64-bit words and selects the second input if the mode signal indicates mode field 1608 is set to indicate a SHA2 hash function that utilizes 32-bit words.

SHA2 sigma circuit 1900 also includes a 64-bit rotate/shift circuit 1908a that rotates and shifts the 64-bit input variable by n3 bits (i.e., 39 bits for SHA2 sigma0 circuit 1802 and 41 bits for SHA2 sigma1 circuit 1806) to obtain a first 64-bit input of multiplexer 1910c. SHA2 sigma circuit 1900 additionally includes a 32-bit rotate/shift circuit 1908b that rotates and shifts the 32 high-order bits of input variable 1902 by m3 bits (i.e., 22 bits for both SHA2 sigma0 circuit 1802 and SHA2 sigma 1 circuit 1806) to obtain, when concatenated with the 32 low-order bits of input variable 1902, a second 64-bit input of multiplexer 1910c. Multiplexer 1910c selects between its first input and second input based on the mode signal. As with multiplexers 1910a, 1910b, multiplexer 1910c selects the first input if the mode signal indicates mode field 1608 is set to indicate a SHA2 hash function that utilizes 64-bit words and selects the second input if the mode signal indicates mode field 1608 is set to indicate a SHA2 hash function that utilizes 32-bit words.

The 64-bit outputs of multiplexers 1910a, 1910b, and 1910c form the inputs of a three-input 64-bit bitwise XOR circuit 1912, which performs a bitwise XOR on its three inputs to generate a 64-bit output 1914. Those skilled in the art will appreciate that in some embodiments of SHA2 sigma circuit 1900, the functions of rotate circuits 1904a-1904b and 1906a-1906b and rotate/shift circuits 1908a-1908b can be implemented by appropriate wiring, allowing the SHA2 sigma circuit 1900 to be realized with three multiplexors 1910a-1910c and a 3-way bitwise XOR circuit 1912 and without explicit rotate and shift circuitry.

Figure 20:
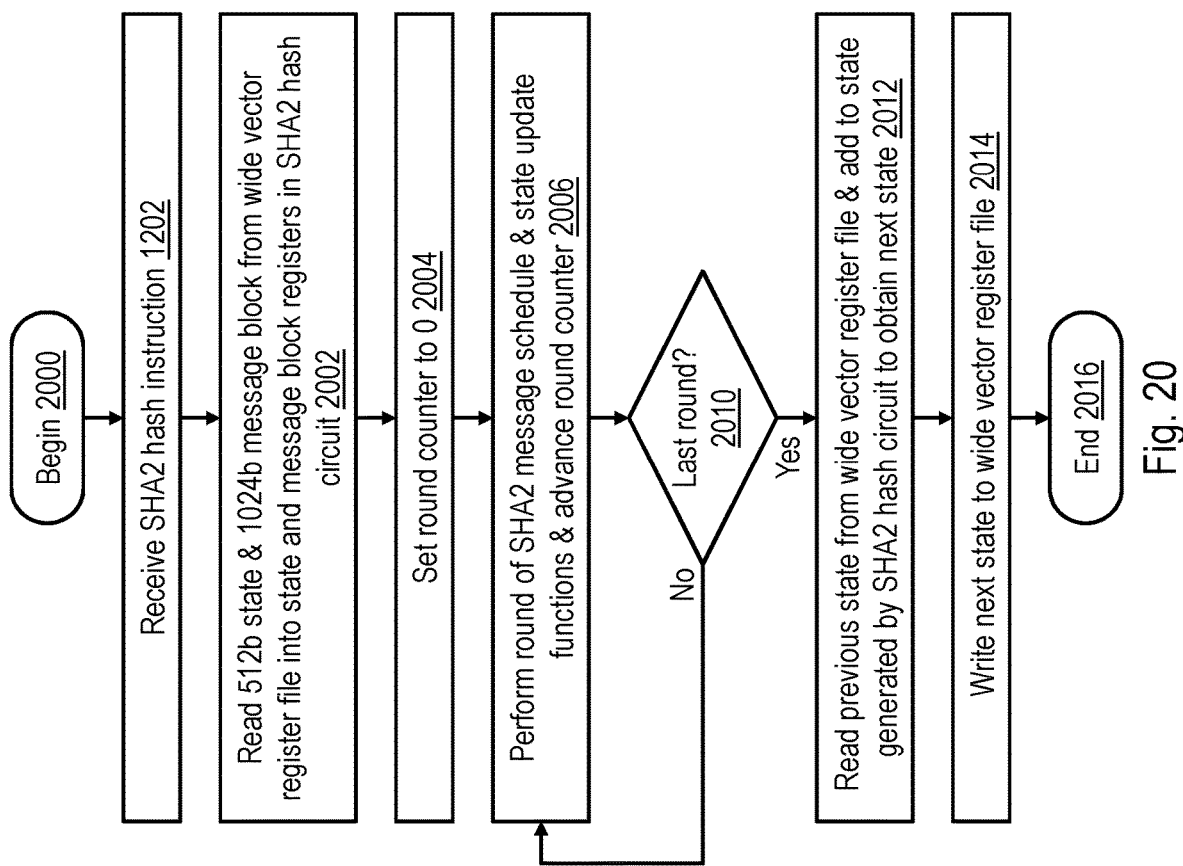
FIG. 20 is a high-level logical flowchart of an exemplary process by which a processor executes a SHA2 hash instruction in accordance with one embodiment.

Referring now to FIG. 20, there is depicted a high-level logical flowchart of an exemplary process for executing a SHA2 hash instruction 1600 in accordance with one embodiment. For ease of understanding, the process of FIG. 20 is described with reference to the exemplary embodiment of SHA2 hash circuit 402 illustrated in FIGS. 17-19.

The process of FIG. 20 begins at block 2000 and then proceeds to block 2002, which illustrates SHA2 hash circuit 402 receiving a SHA2 hash instruction 1600 specifying a particular SHA2 mode (i.e., 32-bit or 64-bit word size), as well as state and message block registers within wide vector register file 316. In response to receipt of the SHA2 hash instruction 1600, control circuit 1720 causes the 512-bit state and 1024-bit message block to be read out from wide vector register file 316 and loaded into state register 1704a and message block register 1704b, respectively, via multiplexers 1702a, 1702b (block 2002). Control circuit 1720 additionally initializes an internal round counter to 0 (block 2004).

The process then proceeds from block 2004 to block 2006, which illustrates control circuit 1720 directing message schedule round circuit 1710 to perform an iteration of the message schedule round function 1400 utilizing the message block buffered in message block register 1704b. In addition, control circuit 1720 directs update working state circuit 1708 to perform an iteration of update round function 1404 based on the appropriate round index, the 64 high-order bits of message block register 1704b, and the input hash state from state register 1704a. The results of the processing of update working state circuit 1708 and message schedule round circuit 1710 are returned by multiplexers 1702a, 1702b to registers 1704a, 1704b, respectively. Control circuit 1110 additionally advances the round counter. At block 2010, control logic 1720 determines by reference to the round counter whether SHA2 hash circuit 402 has performed the last rounds of processing specified by the SHA-2 standard. As noted in Table II, SHA2 hash circuit 402 performs 64 rounds of processing for SHA2 hash functions employing 32-bit words and 80 rounds of processing for SHA2 hash functions employing 64-bit words. If control circuit 1720 determines at block 2010 that at least one additional round of processing remains to be performed, the process returns to block 2006, which has been described. However, in response to determining at block 2010 that all rounds of processing are complete, control circuit 1720 causes the prior state to again be read from wide vector register file 316 and to be added by SIMD adder 1712 to the final state buffered in state register 1704a (block 2012). Control circuit 1720 then directs storage of the resulting next state back into wide vector register file 316 (block 2014). Thereafter, the process of FIG. 20 ends at block 2016.

As discussed above with reference to block 600 of FIG. 6 and block 1304 of FIG. 13, messages processed by the SHA2 and SHA3 hashing functions are padded to create messages having lengths that are even multiples of block length r bits. FIG. 21A depicts an exemplary unpadded message 2100, which has a total length of L bits and includes n message blocks. Of these, the first n−1 message blocks include r bits, but the final message block n includes k bits, where k<r. As shown in FIG. 21B, in the general case, message 2100 is padded by appending r-k padding bits to the end of message block n, resulting in n message blocks all of a length of r bits.

The content of padding bits appended to obtain the padded message can vary depending on the hash function under consideration. For example, in the SHA2 and SHA3/SHAKE hash algorithms discussed herein the padding bits will include bytes marking both the end of the unpadded portion of the message (i.e., an end-of-message (EOM) marker) and the end of last block of the padded message (i.e., an end-of-block (EOB) marker). As explained further below, in some cases, padding bits including the EOM and EOB markers can all be included within the message block containing the final message byte; in other cases, addition of the padding bits can require appending an additional message block to the message. In either case, the disclosed inventions preferably perform message padding in processor registers through execution of one or more instructions rather than through a high-latency memory move operation that transfers the message between two locations in memory.

In at least some architectures, load-store units 224, memory controller 112, and/or system interconnect 110 are not constructed to support data transfers of lengthy data objects (e.g., complete r-bit SHA3/SHAKE and SHA2 message blocks) between system memory 114 and wide vector register file 116. In such architectures, message blocks are transferred in multiple smaller chunks into a narrower register file and then transferred from the narrower register file into one or more wide vector registers of wide vector register file 316. For example, FIG. 22A illustrates an example in which a SHA3/SHAKE message block n is assembled in an architected register file 300 including 256-bit registers r0 to rS 301. In this example, a load-length instruction is executed, for example, by a load-store unit 224 of FIG. 2, to load five 256-bit chunks of a 1152-bit SHA3-224 message block n into registers r0 to r7 and to zero any register bytes not containing message data. Given the 1152-bit length of message blocks in SHA3-224, the message bytes within message block n will, at most, completely fill registers r0 to r3 plus the leading 128 bits of register r4 (of course, the final message block of an unpadded message may contain fewer than r bits). At least the remaining 128 bits of register r4 and all of registers r5 to r7 can be zeroed, either automatically by execution of the load-length instruction or by execution of standard load instructions. (Filling registers r6 and r7 with zeros is only required for generic SHA3 functions applicable to any of the supported message block lengths.) An additional data transfer instruction may then be executed by data transfer circuit 406 or transfer unit 320 to transfer the contents of registers r0 to r7 into registers R0 and R1 317 of wide vector register file 316, which includes registers R0 to RT each having an exemplary width of 1024 bits as discussed above. In an alternative implementation, the same result can be achieved by loading four registers 301 within architected register file 300 to buffer chunks n1 to n4 and then reusing the same registers 301 on a subsequent cycle to buffer chunks n5 to n8.

FIG. 22B depicts a similar example showing the transfer of a 1024-bit SHA2 message block n to a wide vector register 317 in wide vector register file 316 following assembly of the message block in registers 301 of architected register file 300. In this example, a load-length instruction is executed, for example, by load-store unit 224 of FIG. 2, to load four 256-bit chunks of a SHA2 message block n into registers r2 to r5 of architected register file 300 and to zero any register bytes not containing message data. An additional data transfer instruction may then be executed by data transfer circuit 406 to transfer the contents of registers r2 to r5 into register R0 317 of wide vector register file 316. In an alternative implementation, the same result can be achieved by loading two registers 301 within architected register file 300 to buffer chunks n1 and n2 and then reusing the same registers 301 on a subsequent cycle to buffer chunks n3 to n4.

In at least some preferred embodiments, the process for loading message blocks into wide vector register file 316 given in FIGS. 22A-22B is performed for all message blocks of a SHA3/SHAKE or SHA2 message, including message block n, which is the last message block of the unpadded message. As explained below, the end of the message can then be padded, at least in part, within wide vector register file 316 through execution of one or more instructions.

FIGS. 23A-23D depict various padding cases for various lengths of SHA3/SHAKE messages. In accordance with the SHA-3 standard, each message must include EOM padding marking the EOM. Under the SHA3-standard, the EOM padding has a fixed value of x06 for SHA3 hash functions and a fixed value of x1F for SHAKE hash functions. The location of the EOM padding within the padded message varies depending on the message length, which is often unknown at compile time. The SHA-3 standard further mandates that the last byte of each padded message is a fixed-value EOB padding byte.

Figure 23A:
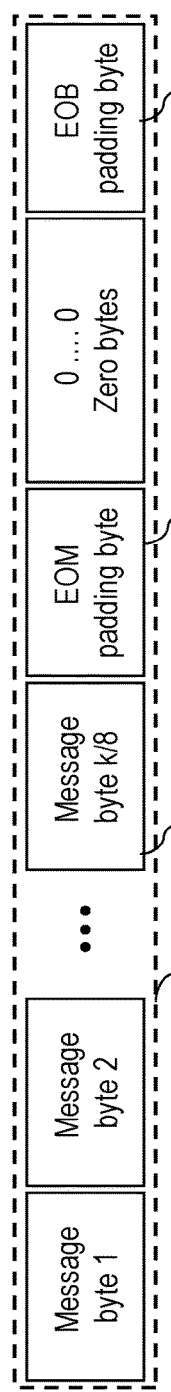
FIGS. 23A-23D illustrate various padding scenarios for SHA3/SHAKE messages.

As shown in FIG. 23A, if the last message block 2300 of a SHA3/SHAKE message includes more than two bytes that do not contain message data, an EOM padding byte 2302 is inserted into the zeroed byte of the relevant wide vector register 317 immediately following the last message byte 2306, and an EOB padding byte 2304 is inserted into the zeroed byte of the wide vector register 317 as the last byte of the padded message block.

Figure 23B:
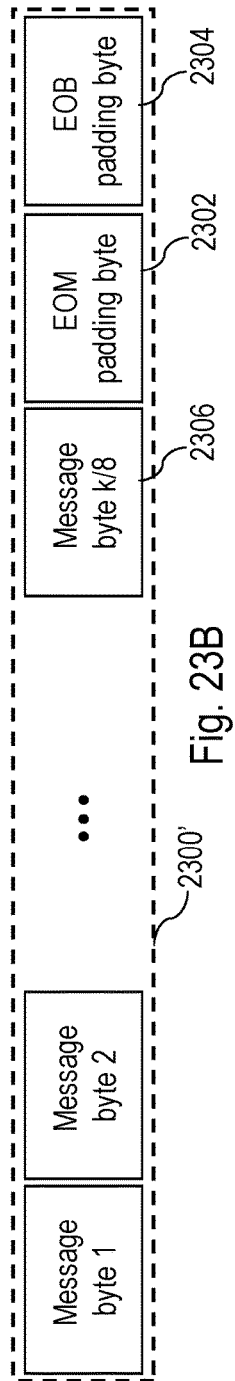

FIG. 23B illustrates a similar second case in which last message block 2300' of the SHA3/SHAKE message includes exactly two zeroed bytes that do not contain message data. In this case, the last two zeroed bytes of last message block 2300' are replaced with the EOM padding byte 2302 followed by EOB padding byte 2304.

Figure 23C:
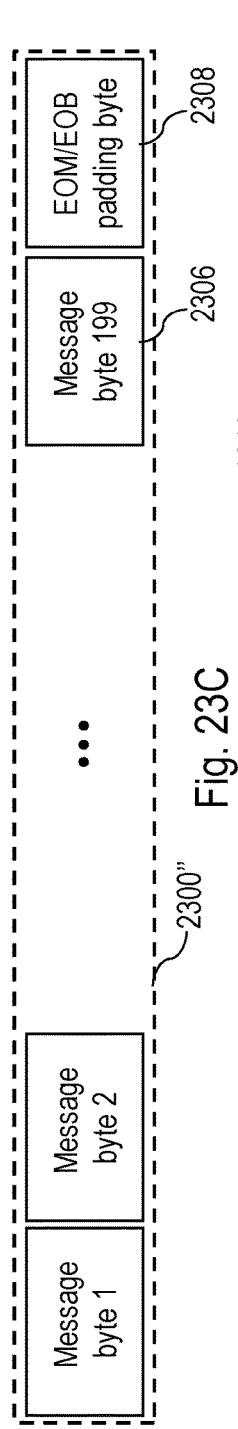

FIG. 23C depicts a third case in which the last message block 2300" of a SHA3/SHAKE message includes only a single zeroed message byte following last message byte 2306. In this case, execution of a padding instruction as described below causes the EOM and EOB padding values to be ORed together and inserted in the final byte of padded message block 2300" as EOM/EOB padding byte 2308.

Figure 23D:
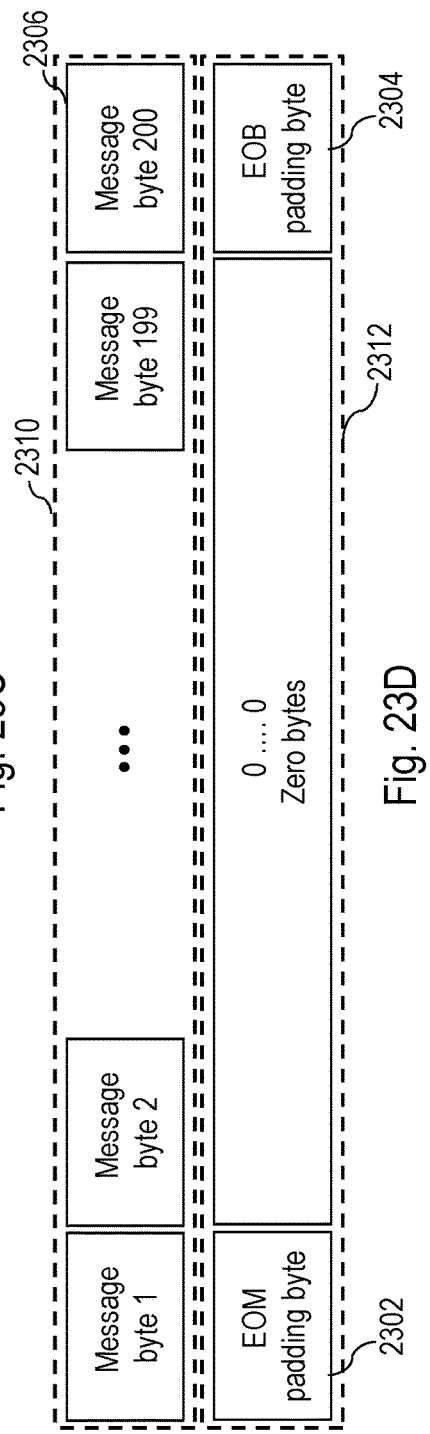

FIG. 23D illustrates the final case in which the last message byte 2306 of the SHA3/SHAKE message is the last byte of a message block 2310. Because message block 2310 does not include capacity for the required EOM and EOB padding in this case, an additional zeroed message block 2312 is appended to the message (e.g., through execution of a load-length instruction). Into this zeroed message block 2312, an EOM padding byte 2302 is inserted as the first byte and an EOB padding byte 2304 is inserted as the last byte. It should be noted that, in each of the four cases depicted in FIGS. 23A-23D, both EOM padding and EOB padding can be advantageously applied by a single padding instruction since both the EOM padding and EOB padding always fall within the same message block. It should also be appreciated that although FIGS. 23A-23D depict the application of padding to messages including an integer number of message bytes, padding can similarly be applied to bit messages not including an integer number of bytes.

In one embodiment, padding of a SHA3/SHAKE message of arbitrary length as shown in FIGS. 23A-23D can be implemented utilizing three instructions. These instructions include: (1) a load-length instruction that stages the final message block of the padded message in specified registers 301 in architected register file 300, (2) a transfer instruction that transfers the message block from the registers 301 in architected register file 300 to one or more wide vector registers 317 in wide vector register file 316 as shown in FIG. 22A, and (3) a padding instruction that inserts EOM and EOB padding at the appropriate byte location(s) in the final message block of the padded SHA3/SHAKE message held in the wide vector register(s) 317. Of course, it is possible in alternative implementations to insert the EOM padding and EOB padding into the final message block utilizing two different instructions. However, for single block messages such as those commonly utilized in post-quantum cryptography schemes, the addition of an extra padding instruction increases latency and undesirably reduces hashing performance.

FIGS. 24A-24D depict various padding cases for various lengths of SHA2 messages. In accordance with the SHA-2 standard, each message must include one EOM padding byte of value x80 in the byte immediately following the last message byte. The location of the EOM padding byte within the padded message thus varies depending on message length. The SHA-2 standard further mandates that the last two words (i.e., either two 32-bit or two 64-bit words depending on the SHA2 hash function in question (see Table II)) contain EOB padding specifying the length of the unpadded message in bits.

Figure 24A:
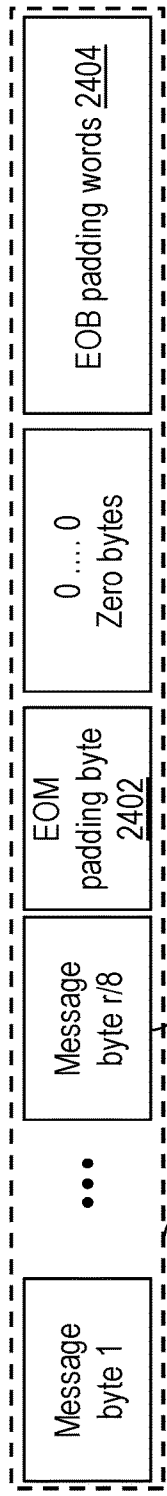
FIGS. 24A-24D depict various padding scenarios for SHA2 messages.

In the first case illustrated in FIG. 24A, the last message block 2400 of a SHA2 message includes more than two words plus one byte that do not contain message data. In this case, last message block 2400 is padded by insertion of an EOM padding byte 2302 into the zeroed byte of the relevant wide vector register 317 immediately following last message byte 2406 and by insertion of two EOB padding words 2404 as the last two words of last message block 2400.

Figure 24B:
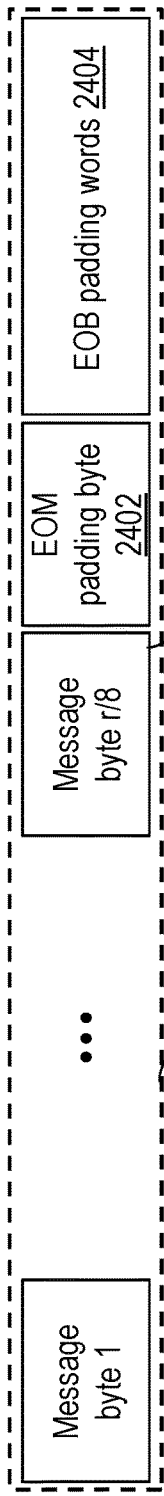

FIG. 24B illustrates a similar second case in which the last message block 2400' of a SHA2 message includes exactly two words plus one byte that do not contain message data. In this case, last message block 2400' is padded by insertion of an EOM padding byte 2402 into the zeroed byte of the relevant wide vector register 317 immediately following last message byte 2406 and insertion of two EOB padding words 2404 as the last two words of last message block 2400.

Figure 24C:
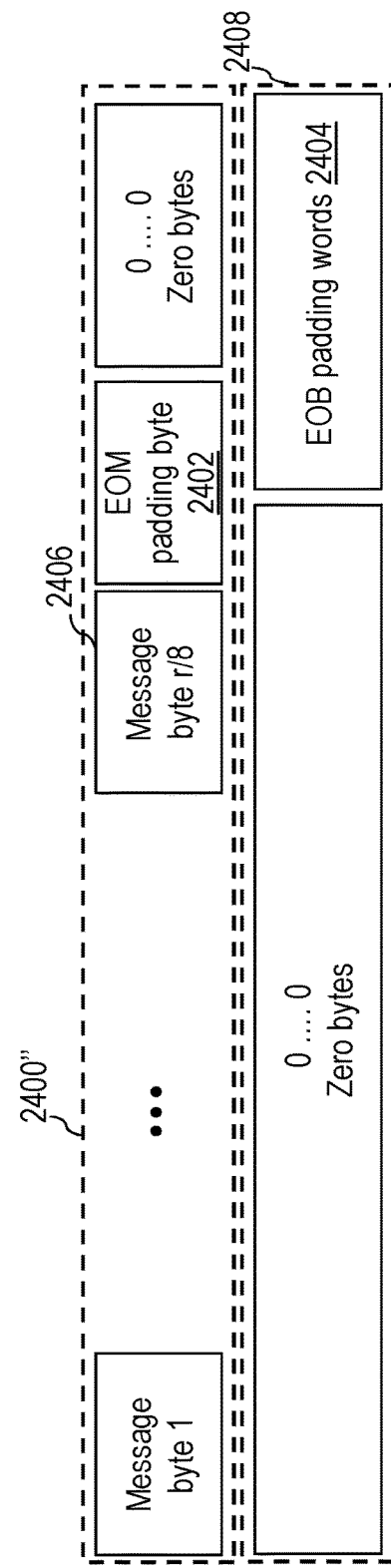

FIG. 24C depicts a third case in which the last message block 2400" of an unpadded SHA2 message includes too few bytes not containing message data to accommodate both a EOM padding byte 2402 and two EOB padding words 2404. In this case, the SHA2 message is padded by insertion of an EOM padding byte 2402 into the zeroed byte of the relevant wide vector register 317 immediately following last message byte 2406. Because the EOB padding words 2404 do not fit within message block 2400", an additional zeroed message block 2408 is appended to the message (e.g., through execution of a load-length instruction). The EOB padding words 2404 are then inserted as the last two words of message block 2408.

Figure 24D:
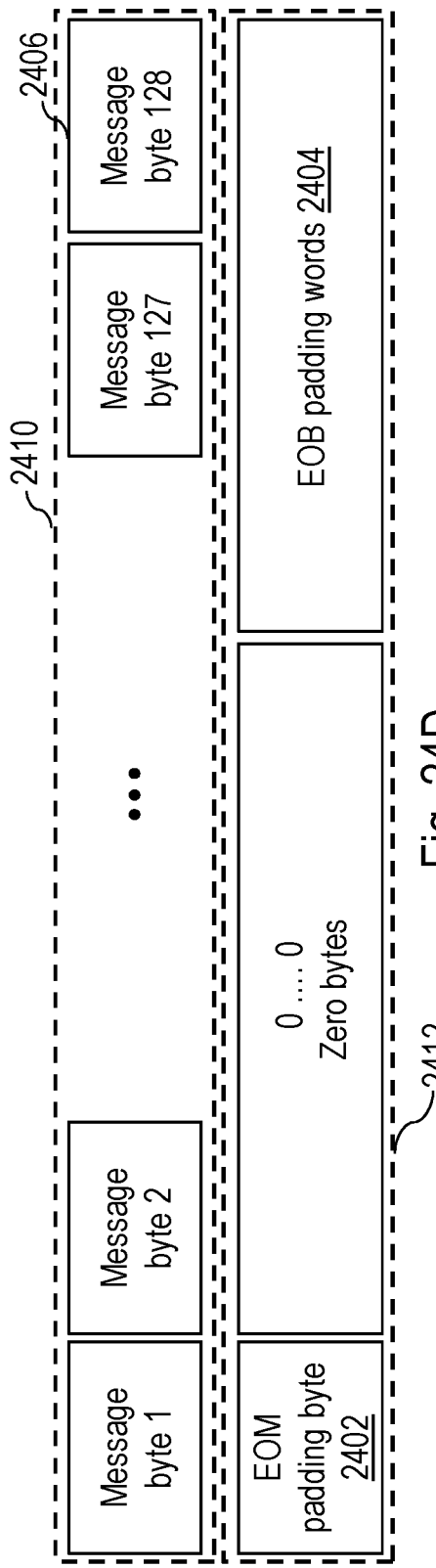

FIG. 24D illustrates a fourth case in which the last message byte 2406 of the SHA2 message forms the last byte of a complete message block 2410. Because message block 2410 does not include capacity for the EOM or EOB padding, an additional zeroed message block 2412 is appended to the SHA2 message. Additional message block 2412 includes EOM padding byte 2302 as the first byte of message block 2412, followed by a number of zeroed bytes, and finally two EOB padding words 2404 at the end of message block 2412.

In one embodiment, padding of a SHA2 message of arbitrary length can be implemented utilizing as few as four instructions. These instructions include: (1) a load-length instruction that places a final message block of the SHA2 message in specified registers 301 in architected register file 300 and that zeroes any register bytes not containing message bytes (2) an insert-word instruction that places two EOB padding words 2404 in the appropriate bytes of a register 301 in architected register file 300 to mark the end of the padded message, (3) a transfer instruction that transfers contents of the registers 301 buffering the message block from architected register file 300 to a wide vector register 317 in wide vector register file 316, and (4) a padding instruction that inserts EOM padding byte 2402 at the appropriate location in the wide vector register 317. In this embodiment, execution of the padding instruction inserts EOM padding byte 2402 but not EOB padding words 2404 because (1) the EOM padding byte 2402 and EOB padding words 2404 may be located in different message blocks and (2) EOB padding words 2404 can be efficiently positioned in the appropriate register 301 within architected register file 300 utilizing an existing insert-word instruction. Of course, in an alternative embodiment, both the EOM padding byte 2402 and EOB padding words 2404 can be applied to a SHA2 message block in the registers 301 of architected register file 300.

Figure 25:
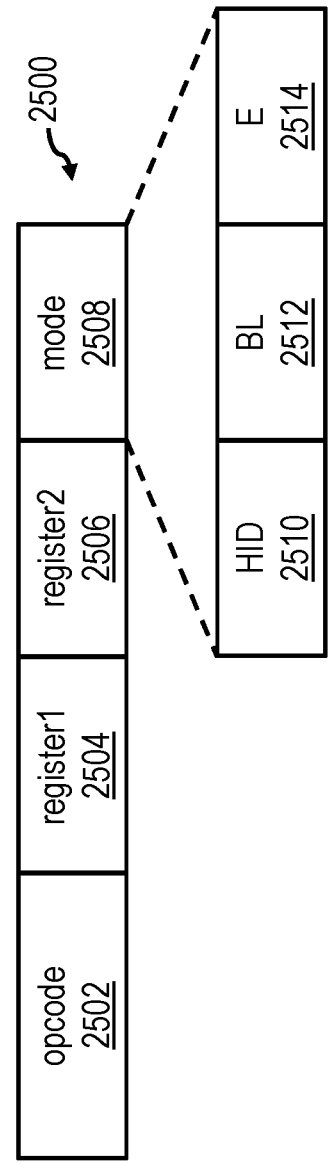
FIG. 25 illustrates an exemplary padding instruction in accordance with one embodiment.

With reference now to FIG. 25, there is illustrated an exemplary padding instruction 2500 in accordance with one embodiment. In at least one embodiment, exemplary padding instruction 2500 may be executed by accelerator unit 314 within data transfer circuit 406 to perform padding for both SHA3/SHAKE and SHA2 message blocks.

In the illustrated example, padding instruction 2500 includes an opcode field 2502 that specifies the architecture-specific operation code for a message padding instruction. Padding instruction additionally includes two register fields 2504, 2506 for specifying the storage locations of source and destination operands of the padding operation. For example, register1 field 2504 can identify the target wide vector register 317 within wide vector register file 316 that buffers the message block to be padded, and register2 field 2506 can specify the register 301 in architected register file 300 holding the remaining message length in bytes.

Padding instruction 2500 further includes a mode field 2508 providing information utilized to pad the message. In one exemplary embodiment, mode field 2508 includes at least three sub-fields, including a hash identifier (HID) sub-field 2510, a block length (BL) sub-field 2512, and an extension (E) sub-field 2514. HID sub-field 2510 indicates the type of hash function being applied to the message block. For example, in one implementation, HID sub-field 2510 may include two bits specifying one of the following hash types: SHA3, SHAKE, SHA2 (64-bit words), and SHA2 (32-bit words). BL sub-field 2512 indicates (possibly when interpreted together with HID sub-field 2510) the length of the message block in bytes. E sub-field 2514 indicates whether or not the wide vector register 317 specified by register1 field 2504 holds the leading segment S0 or trailing segment S1 of the message block. For example, in an embodiment in which wide vector registers 317 are 1024 bits wide, E sub-field 2514 may have a value of b0 if the wide vector register 317 specified by register1 field 2504 does not hold the trailing segment of a message block and may have a value of b1 if the specified wide vector register 317 holds the trailing segment of the message block. Of course, in other embodiments in which wide vector registers 317 have different widths (e.g., 512 bits), E sub-field 2514 may include additional bits to specify additional register segments.

Figure 26:
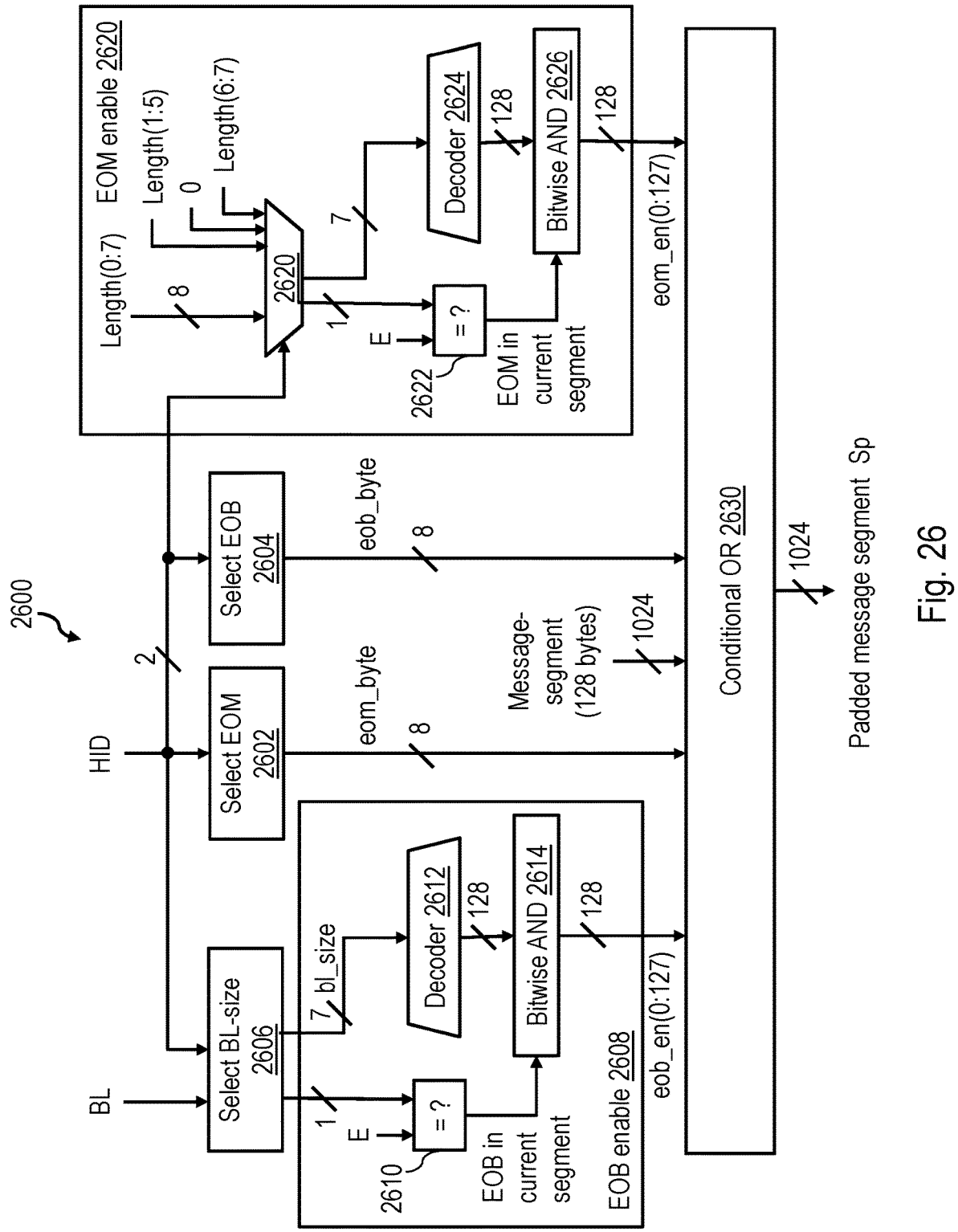
FIG. 26 depicts an exemplary padding circuit in accordance with one embodiment.

Referring now to FIG. 26, there is illustrated an exemplary padding circuit 2600 in accordance with one embodiment. Padding circuit 2600, which can be implemented, for example, as a portion of data transfer circuit 406 of accelerator unit 314, pads a message segment S1 held in a target wide vector register in response to execution of a padding instruction 2500 as shown in FIG. 25. The illustrated example presumes a wide vector register file 316 having 1024-bit wide vector registers 317.

In this exemplary embodiment, padding circuit 2600 includes select EOM circuit 2602, which selects the value of the EOM padding byte 2302 or 2402 (i.e., eom_byte) based on the hash function specified by HID sub-field 2510 of padding instruction 2500. Padding circuit 2600 also includes a select EOB circuit 2604 that, based on HID sub-field 2510, similarly selects the value of the EOB padding byte (i.e., eob_byte) to be inserted by the padding instruction 2500. In the described embodiment, for SHA3/SHAKE hash functions, select EOB circuit 2604 selects the fixed eob_byte value specified by the SHA-3 standard, which is contained in the register indicated by register2 field 2506. For SHA2 hash functions, select EOB circuit 2604 selects a zero eob_byte because EOB padding words 2404 are inserted by a separate instruction in this embodiment. Padding circuit 2600 further includes a select BL-size circuit 2606, which selects and outputs an 8-bit block length value based on the HID field 2510 and BL field 2512 of padding instruction 2500.

The 8-bit block length value output by select BL-size circuit 2606 is received by an EOB enable circuit 2608, which includes a comparator 2610, decoder 2612, and bitwise AND circuit 2614. The high order bit of the 8-bit block length value indicates whether or not the length of the message block exceeds the width of the 1024-bit wide vector register 317 (as would be the case, for example, for SHA3-224, SHAKE-128, and SHAKE 256). The lower order 7-bits of the block length form a block-length-size (bl_size) indicating the number of bytes comprising the segment of the message block buffered in the target wide vector register 317 identified by register1 field 2504. Decoder 2612 decodes the 7-bit bl_size value to obtain a 128-bit representation of the location of the end of the message block within the target wide vector register 317. Comparator 2610 compares the high order bit of the 8-bit block length to E sub-field 2514 of padding instruction 2500 to form a 1-bit indication of whether or not the EOB padding is to be added to the segment of the message block buffered in the target wide vector register (i.e., whether target wide vector register 317 buffers the trailing segment S1 of the message block). This 1-bit indication is then logically combined by bitwise AND circuit 2614 to produce a 128-bit EOB enable signal (eob_en(0:127)) identifying the byte (if any) of the message segment buffered in the target wide vector register 317 at which the EOB padding is to be inserted.

Still referring to FIG. 26, padding circuit 2600 further includes an EOM enable circuit 2620, which includes a selection circuit 2620, a comparator 2610, decoder 2612, and bitwise AND circuit 2614. In the depicted example, selection circuit 2620 is implemented with a two-input multiplexer having a first input coupled to receive an 8-bit indication of message length and a second input coupled to receive an expanded message length applicable to SHA-2 hash functions employing 32-bit words. The expanded message length value at the second input doubles the original length of the message according to the equation EX_LEN=4*(LEN/4)+LEN by the insertion of b0 between bits 5 and 6 of the original length. This technique preserves the bit locations of original bits 6:7, which indicate the byte location, if any, within the 32 high-order bits of the expanded message block of the final message byte. Selection circuit 2620 selects the first of its two 8-bit inputs if HID sub-field 2510 indicates the hash function is a SHA3/SHAKE hash function or a SHA2 hash function employing 64-bit words and alternatively selects the second of its two inputs if HID sub-field 2510 indicate the hash function is a SHA2 hash function employing 32-bit words.

The 8-bit length value output by selection circuit 2620 includes a high order bit that indicates whether or not the block length exceeds the width of the 1024-bit wide vector register file 316 and seven lower order bits indicating the number of bytes comprising the segment of the message block buffered in the target wide vector register 317 identified by register1 field 2504. Decoder 2612 decodes the seven low order bits to obtain a 128-bit representation of the byte location, if any, at which the end of the message byte is to be inserted within the target wide vector register 317. Comparator 2622 compares the high order bit of the length value output by selection circuit 2620 to E sub-field 2514 of padding instruction 2500 to form a 1-bit indication of whether or not the EOM padding is to be added to the segment of the message block buffered in the target wide vector register 317. This 1-bit indication is then logically combined by bitwise AND circuit 2626 to produce a 128-bit EOM enable signal (eom_en(0:127)) identifying the byte (if any) of the message segment buffered in the target wide vector register 317 at which the EOM padding is to be inserted.

The EOB enable signal eob_en(0:127), the EOM enable signal eom_en(0:127), eom_byte, eob_byte, and the message segment from the target wide vector register 317 are all passed to a conditional OR circuit 2630, which conditionally inserts the EOM and/or EOB padding into the message segment to obtain a padded message segment Sp. Padded message segment Sp is then stored back to the target wide vector register 317 specified in register1 field 2504.

Figure 27:
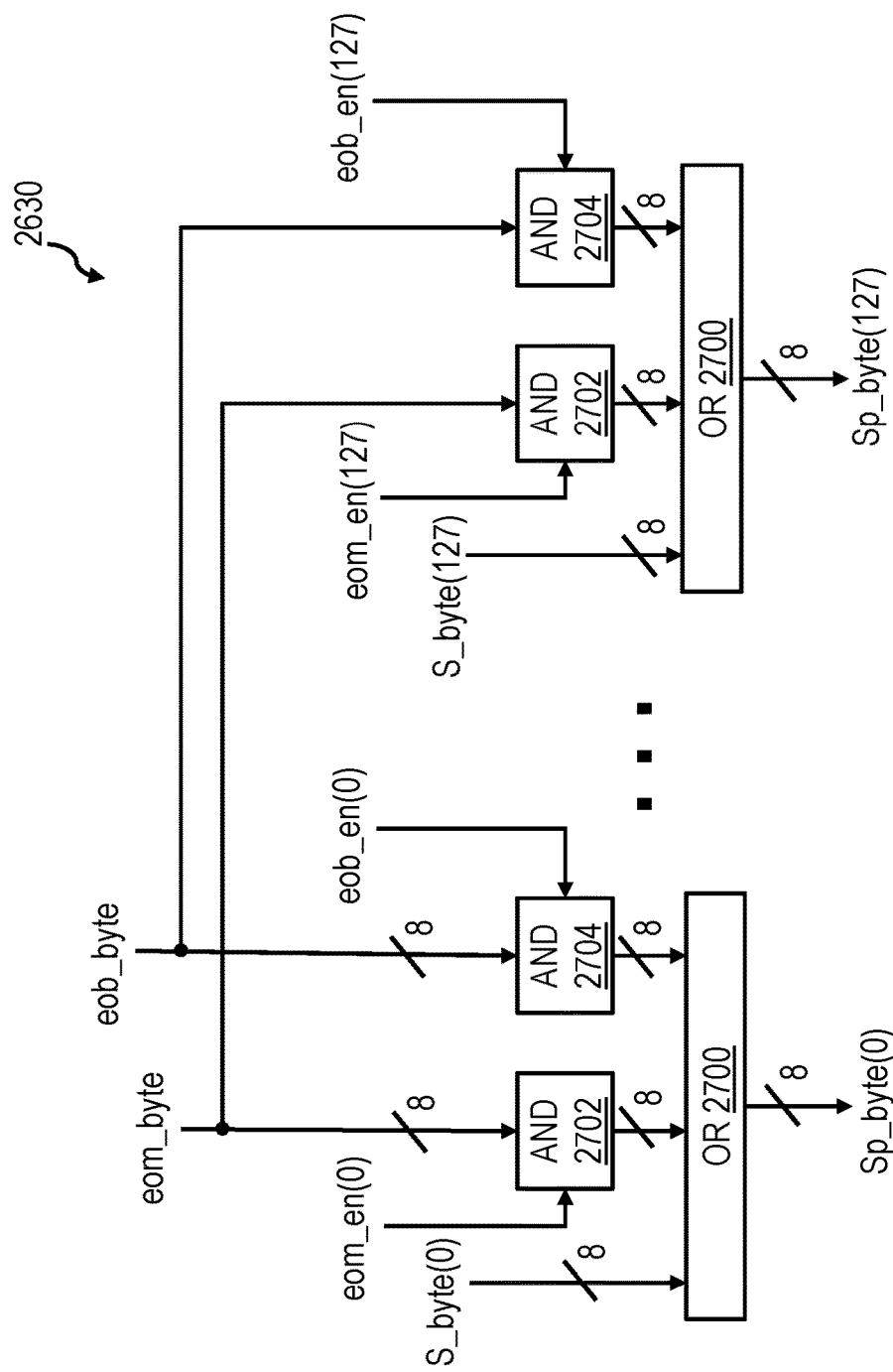
FIG. 27 illustrates an exemplary circuit for combining end-of-block (EOB) and end-of-message (EOM) bytes with a message in accordance with one embodiment.

With reference now to FIG. 27, there is illustrated an exemplary embodiment of conditional OR circuit 2630 of FIG. 26. In this example, each of the 128 bytes of message segment has a respective associated OR gate 2700 having three 8-bit inputs. The first input of OR gate 2700 is coupled to receive a respective byte of message segment S. The second input of OR gate 2700 is coupled to the output of a two-input AND gate 2702 that qualifies the eom_byte with the eom_en() for the given byte of message segment S. The third input of OR gate 2700 is coupled to the output of a two-input AND gate 2704 that qualifies the eob_byte with the eob_en() for the given byte of message segment S. OR gate 2700 performs a logical OR operation on these three inputs and writes the resulting byte of the padded message segment Sp to the target wide vector register 317 in wide vector register file 316. Thus, if neither eom_en() nor eob_en() is asserted for a given byte of message segment S, the relevant OR gate 2700 simply writes the byte of input message segment S to the corresponding byte of padded message segment Sp. If, however, one or both of eom_en()or eob_en() is asserted for a given byte of message segment S, the relevant OR gate 2700 writes the eom_byte, the eob_byte, or the logical combination thereof into the corresponding byte of padded message segment Sp, as indicated by enable signals eom_en() and eob_en().

Figure 28:
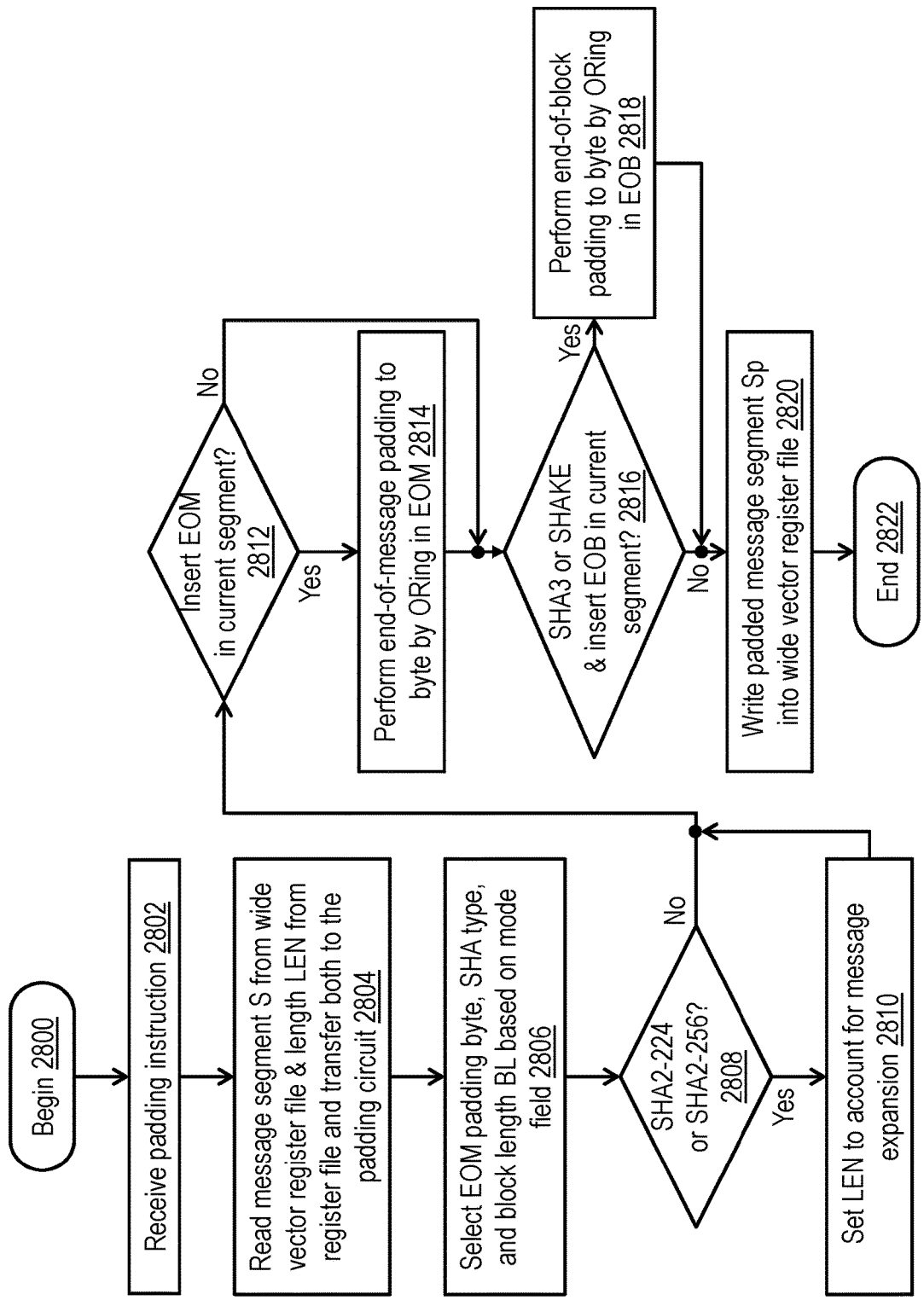
FIG. 28 is a high-level logical flowchart of an exemplary process for padding a message block in accordance with one embodiment.

Referring now to FIG. 28, there is depicted a high-level logical flowchart of an exemplary process for padding a message block in accordance with one embodiment. The illustrated process can be performed by accelerator unit 314 in response to receipt of a padding instruction 2500. For ease of understanding, the process is described below with reference to the exemplary padding circuit depicted in FIGS. 26-27.

The process of FIG. 28 begins at block 2800 and then proceeds to block 2802, which illustrates accelerator unit 314 receiving a padding instruction 2500 for execution. In response to receipt of padding instruction 2500, accelerator unit 314 first accesses the source operands specified by register fields 2504, 2506 of padding instruction 2500 (block 2804). In particular, accelerator unit 314 reads a message segment S from the target wide vector register 317 in wide vector register file 316 specified by register1 field 2504, reads the unpadded message length from the register 301 in architected register file 300 specified by register2 field 2506, and transfers these operands to padding circuit 2600 of FIG. 26, which as noted above may be implemented within data transfer circuit 406. At block 2806, padding circuit 2600 utilizes the mode field 2508 of padding instruction 2500 to select parameters of the padding operation. In particular, select EOM circuit 2602 selects the value of the EOM padding byte (eom_byte) 2302 or 2402 based on the hash function specified by mode field 2508, select EOB circuit 2604 selects the value of the EOB padding byte (eob_byte) to be inserted by the padding instruction 2500 (i.e., a fixed value for SHA3/SHAKE and a zero byte for SHA2 since the EOB padding words 2404 are applied by a separate instruction for SHA2), and select BL-size circuit 2606 selects the block length based on the HID sub-field 2510 and BL sub-field 2512. The eom_byte selected by select EOM circuit 2602 and the eob_byte selected by selected EOB circuit 2604 form inputs to conditional OR circuit 2630.

At block 2808, selection circuit 2620 determines based on the HID sub-field of mode field 2508 whether or not the hash function applied to the message is one of the SHA2-224 or SHA2-256 hash functions that employs 32-bit words. If not, selection circuit 2620 selects and outputs the message length read from the register 301 identified by register2 field 2506 as the length of the message, and the process of FIG. 28 proceeds to block 2812, which is described below. If, however, selection circuit 2620 determines at block 2808 that HID sub-field 2510 of padding instruction 2500 indicates a SHA2 hash function employing 32-bit words, selection circuit 2620 selects and outputs a doubled length for the SHA2 message to account for the message expansion described above with reference to FIG. 15. In one implementation, the expanded SHA2 message length can conveniently be computed as: 4*(LEN/4)+LEN. The process then proceeds from block 2810 to block 2812.

Block 2812 illustrates a determination by EOM enable circuit 2620 whether or not EOM padding is to be placed in the current message segment. If not, the EOM enable vector eom_en(0:127) generated by EOM enable circuit 2620 is all zeros, and no EOM padding is inserted into message segment S. Accordingly, the process passes to block 2816, which is described below. If, however, EOM enable circuit 2620 determines at block 2812 that the EOM padding is to be inserted into message segment S, EOM enable circuit 2620 generates an EOM enable vector eom_en(0:127) identifying the byte of message segment S at which the EOM padding byte is to be inserted, and the EOM padding byte is inserted into the specified byte of padded message segment Sp by conditional OR circuit 2630 (block 2814). The process proceeds from block 2814 to block 2816.

At block 2816, select BL-size circuit 2606 and EOB enable circuit 2608 determine whether or not the hash function specified by mode field 2508 of hash instruction 2500 is either a SHA3 or SHAKE hash function and an EOB padding byte is to be inserted in the message segment S. If not, the EOB enable vector eob_en(0:127) generated by EOB enable circuit 2608 is all zeros, and no EOB padding is inserted into message segment S. Accordingly, the process from block 2816 to passes to block 2820, which is described below. If, however, BL-size circuit 2606 and EOB enable circuit 2620 determine at block 2816 that the hash function specified by mode field 2508 is either a SHA3 or SHAKE hash function and EOB padding is to be inserted into message segment S, EOB enable circuit 2608 generates an EOB enable vector eob_en(0:127) identifying the byte of message segment S at which the EOB padding byte is to be inserted, and the EOB padding byte is inserted into the specified byte of padded message segment Sp by conditional OR circuit 2630 (block 2818). The process then passes to block 2820.

Block 2820 illustrates data transfer circuit 406 writing the resultant padded message segment Sp into the target wide vector register 317 specified by register1 field 2504. Thereafter, the process of FIG. 28 ends at block 2822.

Figure 29:
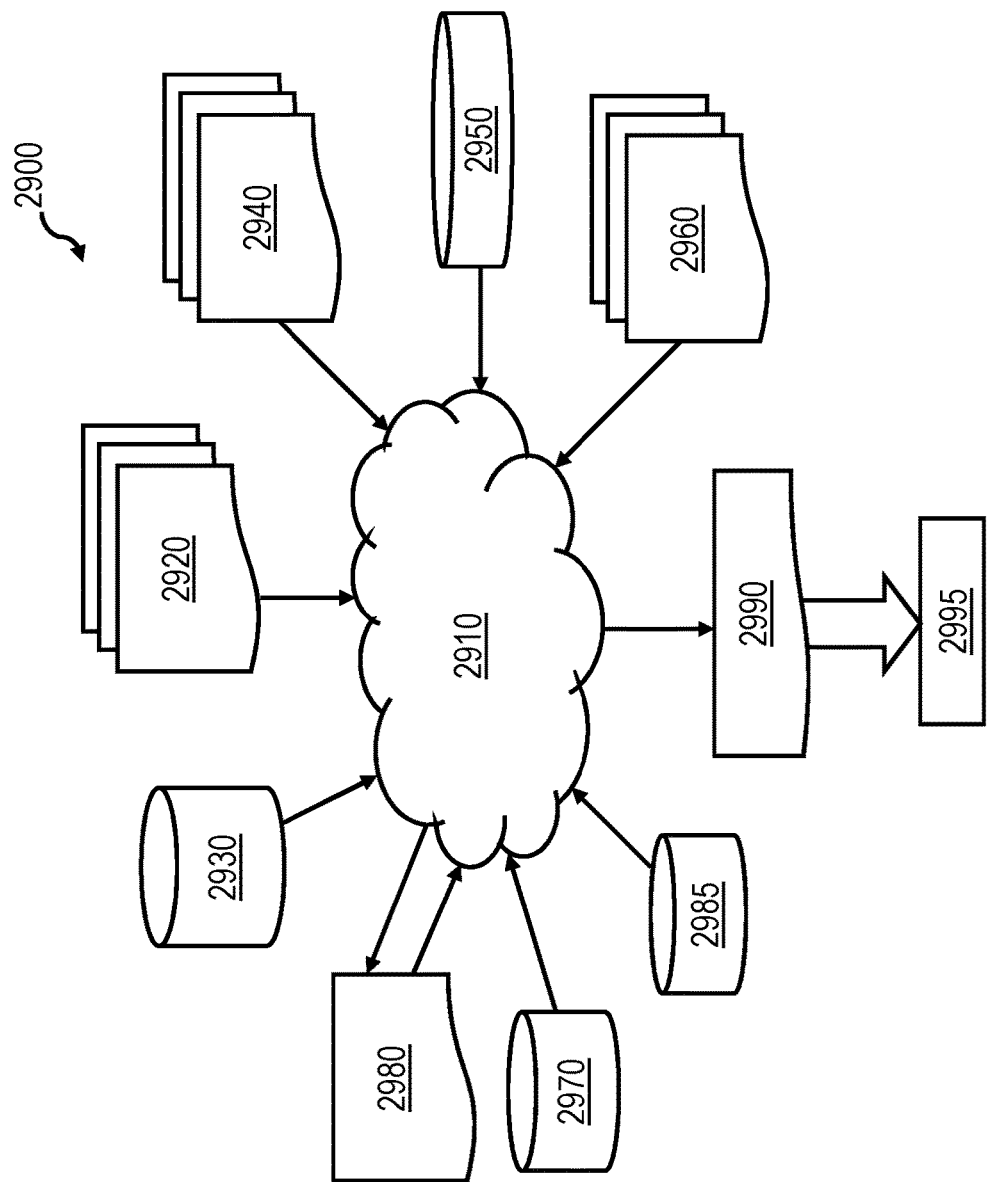
FIG. 29 depicts an exemplary design process in accordance with one embodiment.

With reference now to FIG. 29, there is illustrated a block diagram of an exemplary design flow 2900 used for example, in semiconductor IC logic design, simulation, test, layout, and manufacture. Design flow 2900 includes processes, machines and/or mechanisms for processing design structures or devices to generate logically or otherwise functionally equivalent representations of the design structures and/or devices described above and shown herein. The design structures processed and/or generated by design flow 2900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 2900 may vary depending on the type of representation being designed. For example, a design flow 2900 for building an application specific IC (ASIC) may differ from a design flow 2900 for designing a standard component or from a design flow 2900 for instantiating the design into a programmable array, for example a programmable gate array (PGA) or a field programmable gate array (FPGA) offered by Altera® Inc. or Xilinx® Inc.

FIG. 29 illustrates multiple such design structures including an input design structure 1020 that is preferably processed by a design process 2910. Design structure 2920 may be a logical simulation design structure generated and processed by design process 2910 to produce a logically equivalent functional representation of a hardware device. Design structure 2920 may also or alternatively comprise data and/or program instructions that when processed by design process 2910, generate a functional representation of the physical structure of a hardware device. Whether representing functional and/or structural design features, design structure 2920 may be generated using electronic computer-aided design (ECAD) such as implemented by a core developer/designer. When encoded on a machine-readable data transmission, gate array, or storage medium, design structure 2920 may be accessed and processed by one or more hardware and/or software modules within design process 2910 to simulate or otherwise functionally represent an electronic component, circuit, electronic or logic module, apparatus, device, or system such as those shown herein. As such, design structure 2920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher-level design languages such as C or C++.

Design process 2910 preferably employs and incorporates hardware and/or software modules for synthesizing, translating, or otherwise processing a design/simulation functional equivalent of the components, circuits, devices, or logic structures shown herein to generate a netlist 2980 which may contain design structures such as design structure 2920. Netlist 2980 may comprise, for example, compiled or otherwise processed data structures representing a list of wires, discrete components, logic gates, control circuits, I/O devices, models, etc. that describes the connections to other elements and circuits in an integrated circuit design. Netlist 2980 may be synthesized using an iterative process in which netlist 2980 is resynthesized one or more times depending on design specifications and parameters for the device. As with other design structure types described herein, netlist 2980 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 2910 may include hardware and software modules for processing a variety of input data structure types including netlist 2980. Such data structure types may reside, for example, within library elements 2930 and include a set of commonly used elements, circuits, and devices, including models, layouts, and symbolic representations, for a given manufacturing technology (e.g., different technology nodes, 32 nm, 45 nm, 290 nm, etc.). The data structure types may further include design specifications 2940, characterization data 2950, verification data 2960, design rules 2990, and test data files 2985 which may include input test patterns, output test results, and other testing information. Design process 2910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 2910 without deviating from the scope and spirit of the invention. Design process 2910 may also include modules for performing standard circuit design processes such as timing analysis, verification, design rule checking, place and route operations, etc.

Design process 2910 employs and incorporates logic and physical design tools such as HDL compilers and simulation model build tools to process design structure 2920 together with some or all of the depicted supporting data structures along with any additional mechanical design or data (if applicable), to generate a second design structure 2990. Design structure 2990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 2920, design structure 2990 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 2990 may comprise a compiled, executable HDL simulation model that functionally simulates the devices shown herein.

Design structure 2990 may also employ a data format used for the exchange of layout data of integrated circuits and/or symbolic data format (e.g., information stored in a GDSII (GDS2), GL1, OASIS, map files, or any other suitable format for storing such design data structures). Design structure 2990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 2990 may then proceed to a stage 2995 where, for example, design structure 2990: proceeds to tape-out, is released to manufacturing, is released to a mask house, is sent to another design house, is sent back to the customer, etc.

As has been described, in at least one embodiment, a processor includes an instruction fetch unit that fetches instructions to be executed, a register file including a plurality of registers for storing source and destination operands, and an execution unit for executing a message padding instruction. The message padding instruction includes an operand field indicating one of the plurality of registers buffering a message block segment of a message block to be padded and a mode field indicating which of a plurality of different hash functions is to be applied to the message block. The execution unit includes a padding circuit configured, based on the message padding instruction, to receive a message block segment from one of the plurality of registers indicated by the operand field of the message padding instruction, where the message block spans multiple registers in the register file. Based on which of the plurality of different hash functions is indicated by the mode field of the message padding instruction, the padding circuit selects a byte location in the message block segment at which to insert at least one padding byte and inserts the at least one padding byte at the byte location within the message block segment. The message block segment as padded by the at least one padding byte is then written back to the register file.

In one embodiment, a method of data processing includes fetching, by an instruction fetch unit of a processor, instructions to be executed by the processor, where the instructions include a message padding instruction including an operand field indicating one of the plurality of registers buffering a message block segment of a message block to be padded and a mode field indicating which of a plurality of different hash functions is to be applied to the message block. Based on receiving the message padding instruction, an execution unit of the processor executes the message padding instruction. Executing the message padding instruction includes receiving, from a register file, a message block segment from one of the plurality of registers indicated by the operand field of the message padding instruction, where the message block spans multiple registers in the register file. Based on which of the plurality of different hash functions is indicated by the mode field of the message padding instruction, a byte location in the message block segment at which to insert at least one padding byte is selected, and the at least one padding byte is inserted at the byte location within the message block segment. The message block segment as padded by the at least one padding byte is written back to the register file.

In one embodiment, the message block includes multiple message block segments and the execution unit is configured to detect, based on an indication in the mode field, which of the multiple message block segments the message block segment is.

In one embodiment, the plurality of different hash functions includes a first hash function and a second hash function, and the execution unit is configured to insert both end-of-message (EOM) padding and end-of-block (EOB) padding in the message block segment based on the mode field indicating the first hash function and is configured to insert EOM padding but not EOB padding in the message block segment based on the mode field indicating the second hash function.

In one embodiment, the operand field of the message padding instruction indicates one of the plurality of registers buffering a length parameter of the message segment, the execution unit is configured to interpret the length parameter differently based on which of the plurality of hash functions is indicated by the mode field.

In one embodiment, the at least one padding byte includes an end-of-message (EOM) padding byte, selecting the byte location includes generating an EOM enable vector having a length corresponding to the message block segment, and inserting the at least one padding byte includes inserting the EOM padding byte at the byte location in the message block segment based on the EOM enable vector.

In one embodiment, the padding circuit includes a select circuit configured to select a value of the EOM padding byte based on which of the plurality of different hash functions is indicated by the mode field of the padding instruction.

In one embodiment, the register file is a first register file including a first plurality of registers, the processor includes a second register file including a second plurality of registers each having a length less than that of the first plurality of registers, and the execution unit is further configured to assemble multiple chunks of the message block segment in multiple registers among the second plurality of registers and transfer all of the multiple chunks into one of the first plurality of registers to form the message block segment. In one embodiment, the processor is further configured to insert end-of-block (EOB) padding into one of the multiple registers among the second plurality of registers prior to transfer of the multiple chunks to said one of the first plurality of registers.

In one embodiment, the at least one padding byte includes an end-of-block (EOB) padding byte, selecting the byte location includes generating an EOB enable vector having a length corresponding to the message block segment, and inserting the at least one padding byte includes inserting the EOB padding byte at the byte location in the message block segment based on the EOB enable vector.

In one embodiment, inserting the at least one padding byte includes logically combining the EOB padding byte with an end-of-message (EOM) padding byte.

In one embodiment, the execution unit includes a hash circuit that is configured, based on a hash instruction, to apply a hash function among the SHA family of hash functions to a padded message block including the message block segment as padded.

In one embodiment, the message block segment is a portion of a message comprising a plurality of message blocks having an identical length of r bits, the message block, as padded, includes r bits, and each of the plurality of registers has a length of less than r bits.

While various embodiments have been particularly shown and described, it will be understood by those skilled in the art that various changes in form and detail may be made therein without departing from the spirit and scope of the appended claims and these alternate implementations all fall within the scope of the appended claims. For example, while the invention has been described with specific reference to the SHA family of standards, those skilled in the art will appreciate that the disclosed inventions are also applicable to other hash algorithms (e.g., general Keccak functions, among others). Further, although illustrative numbers of bits and bytes have been discussed herein for ease of understanding, it should be appreciated that the specific numbers of bits and bytes employed in hashing algorithms can and do change over time and that the principles of the disclosed inventions are applicable to cryptographic algorithms regardless of the specific numbers of bits and bytes in a given implementation.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher-level design languages such as C or C++. Furthermore, the data and/or instructions may also employ a data format used for the exchange of layout data of integrated circuits and/or symbolic data format (e.g., information stored in a GDSII (GDS2), GL1, OASIS, map files, or any other suitable format for storing such design data structures).

What is claimed is:

1. A processor, comprising:
an instruction fetch unit that fetches instructions to be executed;
a register file including a plurality of registers for storing source and destination operands; and
an execution unit for executing a message padding instruction among the instructions, wherein the message padding instruction includes an operand field indicating one of the plurality of registers buffering a message block segment of a message block to be padded and a mode field indicating which one of a plurality of different hash functions is to be applied to the message block, wherein the execution unit includes a padding circuit configured, based on execution of the message padding instruction by the execution unit, to perform:
receiving the message block segment from one of the plurality of registers indicated by the operand field of the message padding instruction, wherein the message block spans multiple registers in the register file;
based on which one of the plurality of different hash functions is indicated by the mode field of the message padding instruction, determining whether at least one padding byte is to be inserted within the message block segment;
based on determining that the at least one padding byte is to be inserted within the message block segment, selecting a byte location among multiple byte locations in the message block segment at which to insert the at least one padding byte based on which one of the plurality of different hash function is indicated by the mode field and inserting the at least one padding byte at the selected byte location within the message block segment;
based on determining that the at least one padding byte is not to be inserted within the message block segment, refraining from inserting any padding byte within the message block segment; and
writing the message block segment as processed by the padding circuit back to the register file;
wherein the padding circuit includes at least one enable circuit configured to generate an enable vector to select the byte location and an OR circuit coupled to receive the enable vector and the message block segment and configured to insert, based on the enable vector, the at least one padding byte at the selected byte location in the message block segment.

2. The processor of claim 1, wherein the plurality of different hash functions includes SHA3, SHAKE, and SHA2 hash functions.

3. The processor of claim 1, wherein:
the message block includes multiple message block segments; and
the padding circuit is configured to detect, based on an indication in an extension field of the message padding instruction, which of the multiple message block segments the message block segment is.

4. The processor of claim 1, wherein:
the plurality of different hash functions includes a first hash function and a second hash function; and
the padding circuit is configured to insert both end-of-message (EOM) padding and end-of-block (EOB) padding in the message block segment based on the mode field indicating the first hash function and is configured to insert EOM padding but not EOB padding in the message block segment based on the mode field indicating the second hash function.

5. The processor of claim 1, wherein: the plurality of hash functions includes a first hash function and a second hash function;
the selecting includes selecting the byte location based on a length parameter stored in the register indicated by the operand mode field of the message padding instruction; and
the padding circuit is configured to insert the at least one padding byte at a first byte location based on the length parameter given the mode field indicating the first hash function and to insert the at least one padding byte at a different second byte location based on the length parameter given the mode field indicating the second hash function.

6. The processor of claim 1, wherein:
the padding circuit includes a select circuit configured to select a value of the at least one padding byte among multiple different values based on which one of the plurality of different hash functions is indicated by the mode field of the padding instruction.

7. The processor of claim 1, wherein:
the register file is a first register file;
the plurality of registers is a first plurality of registers;
the processor includes a second register file including a second plurality of registers each having a length less than that of the first plurality of registers;
the execution unit is further configured to assemble multiple chunks of the message block segment in multiple registers among the second plurality of registers and transfer all of the multiple chunks into one of the first plurality of registers to form the message block segment.

8. The processor of claim 7, wherein the processor is further configured to insert end-of-block (EOB) padding into one of the multiple registers among the second plurality of registers prior to transfer of the multiple chunks to said one of the first plurality of registers.

9. The processor of claim 1, wherein:
the enable vector has a length in bits corresponding to a length of the message block segment in bytes; and
inserting the at least one padding byte includes inserting the at least one padding byte at the byte location in the message block segment identified by the enable vector.

10. The processor of claim 1, wherein:
inserting the at least one padding byte includes logically combining an end-of-block (EOB) padding byte with an end-of-message (EOM) padding byte utilizing a Boolean operation to obtain a combined padding byte and inserting the combined padding byte.

11. The processor of claim 1, wherein:
the execution unit includes a hash circuit that is configured, based on a hash instruction among the instructions, to apply a hash function among the SHA family of hash functions to a padded message block including the message block segment as padded.

12. The processor of claim 1, wherein:
the message block segment is a portion of a message comprising a plurality of message blocks having an identical length of r bits;
the message block, as padded, includes r bits; and
each of the plurality of registers has a length of less than r bits.

13. A method of data processing in a processor including a register file, said method comprising:
fetching, by an instruction fetch unit of the processor, instructions to be executed by the processor, wherein the instructions include a message padding instruction including an operand field indicating one of the plurality of registers buffering a message block segment of a message block to be padded and a mode field indicating which one of a plurality of different hash functions is to be applied to the message block; and
based on receiving the message padding instruction, an execution unit of the processor executing the message padding instruction, wherein executing the message padding instruction includes:
receiving, from the register file, the message block segment from one of the plurality of registers indicated by the operand field of the message padding instruction, wherein the message block spans multiple registers in the register file;
based on which one of the plurality of different hash functions is indicated by the mode field of the message padding instruction, determining whether at least one padding byte is to be inserted within the message block segment;
based on determining that the at least one padding byte is to be inserted within the message block segment, selecting a byte location among multiple byte locations in the message block segment at which to insert the at least one padding byte based on which one of the plurality of different hash function is indicated by the mode field and inserting the at least one padding byte at the selected byte location within the message block segment, wherein:
the selecting includes generating by an enable circuit an enable vector specifying the byte location; and
the inserting includes merging by an OR circuit, coupled to receive the enable vector and the message block segment, the at least one padding byte and the message block vector;
based on determining that the at least one padding byte is not to be inserted within the message block segment, refraining from inserting any padding byte within the message block segment; and
writing the message block segment as processed by the padding circuit back to the register file.

14. The method of claim 13, wherein:
the message block includes multiple message block segments; and
the method further comprising detecting, based on an indication in an extension field of the message padding instruction, which of the multiple message block segments the message block segment is.

15. The method of claim 13, wherein:
the plurality of different hash functions includes a first hash function and a second hash function; and
the executing includes inserting both end-of-message (EOM) padding and end-of-block (EOB) padding in the message block segment based on the mode field indicating the first hash function and is configured to insert EOM padding but not EOB padding in the message block segment based on the mode field indicating the second hash function.

16. The method of claim 13, wherein: the plurality of hash functions includes a first hash function and a second hash function;
the selecting includes selecting the byte location based on a length parameter stored in the register indicated by the mode field of the message padding instruction; and
the inserting includes inserting the at least one padding byte at a first byte location based on the length parameter given the mode field indicating the first hash function and inserting the at least one padding byte at a different second byte location based on the length parameter given the mode field indicating the second hash function.

17. The method of claim 13, further comprising:
selecting, by the execution unit, a value of the at least one padding byte among multiple different values based on which one of a plurality of different hash functions is indicated by the mode field of the padding instruction.

18. The method of claim 13, wherein:
the register file of the processor is a first register file;
the plurality of registers is a first plurality of registers;
the processor includes a second register file including a second plurality of registers each having a length less than that of the first plurality of registers;
the method further comprises assembling multiple chunks of the message block segment in multiple registers among the second plurality of registers and transferring all of the multiple chunks into one of the first plurality of registers to form the message block segment.

19. The method of claim 18, further comprising inserting end-of-block (EOB) padding into one of the multiple registers among the second plurality of registers prior to transfer of the multiple chunks to said one of the first plurality of registers.

20. The method of claim 13, further comprising:
based on a hash instruction among the instructions, applying, by hash circuit of the processor, a hash function among the SHA family of hash functions to a padded message block including the message block segment as padded.

* * * * *